(12) United States Patent
Yushkina et al.

(10) Patent No.: US 12,547,668 B2
(45) Date of Patent: *Feb. 10, 2026

(54) USER INTERFACES FOR SURFACING WEB BROWSER HISTORY DATA

(71) Applicant: Google LLC, Mountain View, CA (US)

(72) Inventors: Yana Yushkina, San Francisco, CA (US); Sophie Chang, Seattle, WA (US); Michael Blair Crouse, Seattle, WA (US); Mohamad Hasan Ahmadi, Los Angeles, CA (US); Tommy Chendong Li, Santa Monica, CA (US); Manuk Armen Hovanesian, Glendale, CA (US); Justin Gabriel Donnelly, Weslake Village, CA (US); Tarun Bansal, Seattle, WA (US); John Oliver Por, San Francisco, CA (US); Lukas Schubsda, Oakland, CA (US)

(73) Assignee: GOOGLE LLC, Mountain View, CA (US)

(*) Notice: Subject to any disclaimer, the term of this patent is extended or adjusted under 35 U.S.C. 154(b) by 175 days.

This patent is subject to a terminal disclaimer.

(21) Appl. No.: 18/482,565

(22) Filed: Oct. 6, 2023

(65) Prior Publication Data

US 2024/0037168 A1 Feb. 1, 2024

Related U.S. Application Data

(63) Continuation of application No. 17/817,761, filed on Aug. 5, 2022, now Pat. No. 11,783,003.

(Continued)

(51) Int. Cl.
*G06F 16/957* (2019.01)
*G06F 16/9535* (2019.01)
*G06F 16/955* (2019.01)

(52) U.S. Cl.
CPC ...... *G06F 16/9574* (2019.01); *G06F 16/9535* (2019.01); *G06F 16/955* (2019.01); *G06F 16/9558* (2019.01)

(58) Field of Classification Search
None
See application file for complete search history.

(56) References Cited

U.S. PATENT DOCUMENTS

| 7,296,016 B1 | 11/2007 | Farach-Colton et al. |
| 7,827,170 B1 | 11/2010 | Horling et al. |

(Continued)

FOREIGN PATENT DOCUMENTS

| JP | 2016520936 A | 7/2016 |
| WO | 2007116705 A1 | 10/2007 |
| WO | 2017001946 A1 | 1/2017 |

OTHER PUBLICATIONS

International Search Report and Written Opinion for PCT Application No. PCT/US2022/074594, mailed on Nov. 15, 2022, 11 pages.

(Continued)

*Primary Examiner* — Maikhanh Nguyen
(74) *Attorney, Agent, or Firm* — Brake Hughes Bellermann LLP

(57) ABSTRACT

Systems and methods are described that include generating a repository of metadata based on a plurality of webpages accessed and saved in a browser history of a web browser executing on a computing device, generating, based on the metadata, a history cluster including a portion of the plurality of webpages related to a topic where the history cluster generation is based on the source events and the access timestamps of the webpages in the portion, and assigning respective scores for the webpages in the portion. In response to a request to view browser activity associated with the topic, the systems and method may generate and display a history cluster listing for the topic where the (Continued)

history cluster listing includes visit listings associated with the webpages in the history cluster that are determined to have a score that meets a threshold score.

16 Claims, 16 Drawing Sheets

Related U.S. Application Data

(60) Provisional application No. 63/260,164, filed on Aug. 11, 2021.

(56) References Cited

U.S. PATENT DOCUMENTS

| | | | |
|---|---|---|---|
| 7,953,730 | B1 | 5/2011 | Bleckner et al. |
| 8,078,607 | B2 | 12/2011 | Oztekin et al. |
| 8,131,731 | B2 | 3/2012 | Vaughan et al. |
| 8,229,911 | B2 | 7/2012 | Bennett |
| 8,600,967 | B2 | 12/2013 | Jin et al. |
| 8,688,706 | B2 | 4/2014 | Liebald et al. |
| 8,935,245 | B1 | 1/2015 | Cionca et al. |
| 9,069,825 | B1 | 6/2015 | Chang |
| 9,323,846 | B2 | 4/2016 | Jeh et al. |
| 9,600,531 | B1 | 3/2017 | Rakowski et al. |
| 9,767,200 | B1 | 9/2017 | Chang |
| 10,387,546 | B1 | 8/2019 | Duran et al. |
| 11,138,286 | B2 | 10/2021 | Birch et al. |
| 11,372,945 | B2 | 6/2022 | Horiuchi et al. |
| 11,783,003 | B2 * | 10/2023 | Yushkina .............. G06F 16/955 715/234 |
| 2006/0224583 | A1 | 10/2006 | Fikes et al. |
| 2007/0011616 | A1 | 1/2007 | Ording et al. |
| 2007/0073641 | A1 | 3/2007 | Perry et al. |
| 2007/0255754 | A1 | 11/2007 | Gheel |
| 2008/0022229 | A1 | 1/2008 | Bhumkar et al. |
| 2010/0070928 | A1 | 3/2010 | Goodger et al. |
| 2010/0082649 | A1 | 4/2010 | Gutt et al. |
| 2011/0035345 | A1 | 2/2011 | Duan et al. |
| 2011/0035402 | A1 | 2/2011 | Agrawal et al. |
| 2011/0191344 | A1 | 8/2011 | Jin et al. |
| 2011/0252329 | A1 | 10/2011 | Broman |
| 2011/0289068 | A1 | 11/2011 | Teevan et al. |
| 2012/0053927 | A1 | 3/2012 | Kulkarni et al. |
| 2013/0117675 | A1 | 5/2013 | Twig et al. |
| 2013/0254685 | A1 | 9/2013 | Batraski et al. |
| 2013/0297590 | A1 | 11/2013 | Zukovsky et al. |
| 2014/0026037 | A1 | 1/2014 | Garb et al. |
| 2014/0164960 | A1 | 6/2014 | Kuo et al. |
| 2014/0279793 | A1 | 9/2014 | Wohlstadter |
| 2014/0344660 | A1 | 11/2014 | Hayden |
| 2014/0359489 | A1 | 12/2014 | Zhao et al. |
| 2015/0205462 | A1 | 7/2015 | Jitkoff et al. |
| 2015/0324434 | A1 | 11/2015 | Greenwood et al. |
| 2016/0085428 | A1 | 3/2016 | Ashby |
| 2016/0164984 | A1 | 6/2016 | Chuchro et al. |
| 2017/0199638 | A1 | 7/2017 | Bhupatiraju et al. |
| 2017/0293419 | A1 | 10/2017 | Dipin |
| 2018/0113583 | A1 | 4/2018 | Jain et al. |
| 2018/0307768 | A1 | 10/2018 | Hu |
| 2020/0104403 | A1 | 4/2020 | Agarwal |
| 2022/0092133 | A1 | 3/2022 | Devereux et al. |

OTHER PUBLICATIONS

Wahab, et al., "How to View More Suggestion in the Chrome Address Bar", XP055892453, retrieved on Feb. 16, 2022 from https://www.addictivetips.com/web/viewmore-suggestion-in-chrome-address-bar, Feb. 1, 2018, 2 pages.

Dipin, et al., "User Friendly Tab Management in Web Browsers", 2019 16th IEEE Annual Consumer Communications & Networking Conference (CCNC), 4 pages.

Ganesha, et al., "Intuitive Content Rendering By Intelligently Organizing Browser Tabs for Enhanced User Experience and Better Screen Space Utilization; Smart Tabs—A New Invention for Intelligently Organizing the Browser Tabs", 2015 IEEE International Advance Computing Conference (IACC), pp. 1030-1034.

Sathish, et al., "Semantics-Based Browsing Using Latent Topic Warped Indexes", 2016 IEEE Tenth International Conference on Semantic Computing, pp. 378-381.

Fedewa, "How to Use Tab Groups in Microsoft Edge", [Viewed on internet on Oct. 18, 2024] Viewed on internet. <URL: https://www.howtogeek.com/758448/how-to-use-tab-groups-in-microsoft-edge/> Published on Oct. 1, 2021.

* cited by examiner

FIG. 4B

Kitchen ranges - Journeys ×  +
← → C  ⓘ //histories/?q=kitchen+ranges

← Based on web activity related to "kitchen ranges"  410  100A

◎ History
🔍 kitchen ranges  ⓘ Y Brand "30" Smart Slide-In, Front-Control, Dual-Fuel, Double-Oven Rang...
                    Yappliances.com/appliance/30-smart-slide-in-front-control-dua...
                    1 months ago
🕘 History          Related: 🔍 things to know about new ovens  🔍 how to burn in ovens
▦ Journeys         114
◱ Tabs from other devices   dual fuel ranges - Search
🗑 Clear browsing data 🗗   ○ Gas vs Dual Fuel Ranges | AppConnection
                            appconnection.com
                          □ The best dual fuel range - Tribune
                            tribune.com
                          □ Top 10 Dual-Fuel Ranges
                          138
                    Related: 🔍 Are dual fuel ranges worth it?  🔍 What are the benefits of a dual fuel range?
                    140
                    Show more ⌄

From Tab Groups and Bookmarks                                  418
                    Recent Tab    422    10 Things        Design
                    Group 420            Nobody Tells     Idea
                                         You about 424    TV  426
                                         Kitchen
                                         Renovations From Search History                                            428
                    □ 12:05 PM  K  xbrandapps    us.xbrand.com
                    □ 12:06 PM  K  xbrandwarranty  us.xbrand.com
                    □ 12:07 PM  K  xbrandpricinglist  us.xbrand.com

Tabs | x | +

← → C ⊕ ://SearchHistory ☆

History

🔍 Search your search history  514

Tabs from other devices  544  — List  — Journeys 546

Clear browsing data ⟲

Today – Tuesday, January 19, 2020  516

☐ 12:05 PM  K  xbrand  us.xbrand.com  ⋯
☐ 12:05 PM  K  xbrand  us.xbrand.com  ⋯
☐ 12:05 PM  K  xbrand  us.xbrand.com  ⋯
☐ 12:05 PM  K  xbrand  us.xbrand.com  ⋯
☐ 12:05 PM  T  ybrand  ybrandusa.com  ⋯
☐ 12:05 PM  T  ybrand  ybrandusa.com  ⋯
☐ 12:05 PM  T  ybrand  ybrandusa.com  ⋯
☐ 12:05 PM  T  ybrand  ybrandusa.com  ⋯
☐ 12:05 PM  🗓  Calendar  calandarofmine.com  ⋯
☐ 12:05 PM  ✉  email  mail.myemail.com  ⋯
☐ 12:05 PM  ⟳  Local news  mynews.com  ⋯
☐ 12:05 PM  O  Music  mymusic.com  ⋯

Yesterday – Monday, January 19, 2020  518

☐ 12:05 PM  O  Music  mymusic.com  ⋯

ⓘ Your Account may have other forms of browsing history at myactivity.com

FIG. 5D

USER INTERFACES FOR SURFACING WEB BROWSER HISTORY DATA

CROSS REFERENCE TO RELATED APPLICATIONS

This application is a continuation of, and claims priority to, U.S. patent application Ser. No. 17/817,761, filed on Aug. 5, 2022, entitled "USER INTERFACES FOR SURFACING WEB BROWSER HISTORY DATA", now U.S. Pat. No. 11,783,003, which claims priority to U.S. Patent Application No. 63/260,164, filed on Aug. 11, 2021, entitled "USER INTERFACES FOR SURFACING WEB BROWSER HISTORY DATA", the disclosures of which are incorporated by reference herein in their entirety.

BACKGROUND

Web browsers enable users to navigate to a large number of websites during various browser sessions carried out over time. As the user navigates the websites, the web browser may store a browser history indicating webpage visits. The webpage visits may be stored sequentially based on access time and date. It may be difficult for a user to trace steps back to a prior webpage visit using the stored history. For example, the user may have to manually search through lists of the stored navigation information to find data for a previous webpage visit. Extensive searching of stored navigation information can be resource intensive, which can be of particular importance for mobile computing devices with limited battery capacity.

SUMMARY

The systems and methods described herein function as a browser history organizing tool for generating history cluster listings that represent search activity associated with a web browser. In particular, the history cluster listings may, with user permission, visualize browser history (e.g., search history data, download history data, cookies, cached data, and any related search activity associated with the web browser) into cohesive search journeys. With user permission, the systems and methods described herein may use the browser history data and/or other metadata generated for (or stored within) a browser history of the web browser to generate history clusters. The history clusters may represent a search journey including several search activities related to a particular topic over time. Any number of history clusters may be generated using a model (e.g., clustering algorithms, machine-learned models) that are performed onboard a local computing device.

The history clusters represent the basis on which one or more history cluster listings are generated by the systems and methods described herein. A history cluster listing may include search activity analyzed, selected, organized, and formatted for display in a user interface (e.g., UI) without user intervention. In some implementations, a history cluster listing may be generated using ML algorithms. For example, a web browser can execute ML analysis using the ML algorithms on the locally stored browser history data, for example, with user permission and without accessing server devices, or other connected devices. Thus, local data and on device analysis is employed to analyze, organize, and format the search activity for display in a UI. Information may therefore be provided to a user in a secure and efficient manner. Further to the descriptions above, a user is provided with controls allowing the user to make an election as to both if and when local data saved in the browser history data, if, when, and how much of the browser history data is analyzed to generate history clusters, etc. and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined from the browser history data. Thus, the user may have control over what information is collected about the user, how that information is used, and what information is provided to the user.

In some implementations, a history cluster listing may include browser history data, search history data, search activity information, and related search result information depicted according to determined topics, scores, and/or rankings. The scores and/or rankings may be based at least in part on metadata corresponding to browser activities (e.g., engagement activities, click events, search events, tab/bookmark events, etc.) performed in the web browser and/or particular browser history data (e.g., access timestamps, topics, subtopics, cookies, etc.) and the like.

In some implementations, the history cluster listings may be organized according to topic and/or subtopic based on any number of generated history clusters. In some implementations, the history cluster listings may include controls and/or indicators to enable a user to resume a search or to perform additional research associated with a particular history cluster listing, webpage, and/or search result. For example, the systems and methods described herein may provide access points represented as UI elements configured to allow reentry to searching. The access points may be provided in a browser page, a search history page, a browser history page, a browser address toolbar (e.g., an omnibox or other search control), actions associated with the browser address toolbar (or other search control), and/or menus or controls associated with such access points.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first general aspect, a computer-implemented method is described. The method may include generating a repository of metadata based on a plurality of webpages accessed and saved in a browser history of a web browser executing on a computing device where the metadata includes, for respective webpages, a source event, an access timestamp, and at least one topic. The method may also include generating, based on the metadata, a history cluster including a portion of the plurality of webpages related to a topic where the history cluster generation is based on the source events and the access timestamps of the webpages in the portion. The method may also include assigning respective scores for the webpages in the portion where the respective scores based at least in part on the access timestamps and generated engagement scores for the respective webpages. In response to a request to view browser activity associated with the topic, the method may include generating a history cluster listing for the topic where the history cluster listing includes visit listings associated with the webpages in the history cluster that are determined to have a score that meets a threshold score and are organized according to the respective scores. The method may also include displaying the history cluster listing.

Implementations can include any or all of the following features. In some implementations, a visit listing of the visit listings includes a snippet for at least one webpage of the plurality of webpages in the portion and the history cluster includes a related action control. In some implementations, the history cluster listing further includes a plurality of visit listings corresponding to at least one webpage in the portion where the plurality of visit listings are presented within the browser history of the web browser. In some implementations, an action control configured to resume a previous search associated with the plurality of visit listings is also included in the history cluster listing.

In some implementations, the metadata further includes, for a webpage of the plurality of webpages, determined webpage entities, a plurality of suggested related searches, and a dwell time on the webpage. In some implementations, the history cluster is generated as output of a machine learned model executing on the computing device and using the metadata as input. In some implementations, the metadata further includes webpage identifiers defined for the webpages in the portion where the webpage identifiers indicate whether the respective webpage in the portion is part of a tab group, a bookmark, or a search results page accessed by the computing device. In some implementations, the generated engagement scores include respective engagement metrics for the webpages in the portion where the respective engagement metrics are used for selecting a prominence level with which to display, in the history cluster listing, snippets for at least one webpage of the plurality of webpages in the portion.

In some implementations, generating the repository of metadata further includes de-duping the plurality of webpages accessed and saved in the browser history, the de-duping including determining duplicative webpage accesses in the plurality of webpages accessed, selecting, for the duplicative webpage accesses, a webpage with a latest access timestamp with respect to access timestamps associated with the determined duplicative webpage accesses, and generating, for the webpage with the latest access timestamp, the metadata for storage in the repository.

In some implementations, the history cluster has a title and the method further includes displaying the title as a suggested link, wherein selection of the link issues the request to view the history cluster. In some implementations, the suggested link is displayed as a search suggestion in a search engine or the suggested link is displayed as an option in a search history of the web browser. In some implementations, a computing device is described, configured to perform the method of any of the above combination of features.

In a second general aspect, a system is described. The system may include a computing device executing a web browser, a renderer, and a user interface generator of the web browser. The user interface generator is configured to generate a search history user interface based on a history cluster related to a topic in response to a request to view search activity associated with the topic where the history cluster includes a plurality of webpages accessed and saved in a search history of the web browser, the search history user interface including a history cluster listing and an action control. The history cluster listing may be depicted in the history of the web browser and populated with at least a portion of the plurality of webpages determined to be related to the topic where the portion of the plurality of webpages includes a plurality of visit listings corresponding to the cluster and to search history data from the search history indicating that the portion belongs to a tab group or a bookmark of the web browser. The action control may be configured to resume a previous search associated with the cluster. The renderer may be configured to cause display of the generated search history user interface with the portion of the plurality of webpages and the search history data.

Implementations can include any or all of the following features. In some implementations, the history cluster is generated based on metadata associated with webpages in the portion, the metadata including a source event, an access timestamp, an engagement score, and subtopics associated with the at least one topic. In some implementations, the engagement score includes respective engagement metrics for the webpages in the portion, the respective engagement metrics used for selecting a prominence level with which to display, in the history cluster listing, snippets for at least one webpage in the portion. In some implementations, the user interface generator is further configured to receive a request to remove a webpage rendered in the history cluster listing and cause, based on the request, deletion of a stored record of access to the webpage from the search history.

In a third general aspect, a non-transitory computer-readable medium is described that includes a memory storing instructions that, when executed by the at least one processor, cause the at least one processor to perform operations comprising generating a repository of metadata based on a plurality of webpages accessed and saved in a browser history of a web browser executing on a computing device, where the metadata includes, for respective webpages, a source event, an access timestamp, and at least one topic, generating, based on the metadata, a history cluster representing a portion of the plurality of webpages related to a topic, where the history cluster generation being based on the source events and the access timestamps of the webpages in the portion, assigning respective scores for the webpages in the portion, where the respective scores are based at least in part on the access timestamps and generated engagement scores for the respective webpages, and in response to a request to view browser activity associated with the history cluster, generating a history cluster listing for the topic where the history cluster listing is organized according to the respective scores and including visit listings associated with the webpages in the portion that are determined to have a score that meets a threshold score, and displaying the history cluster listing.

Implementations can include any or all of the following features. In some implementations, a visit listing of the visit listings includes a snippet for at least one webpage of the plurality of webpages in the portion and the history cluster includes a related action control. In some implementations, the history cluster listing further includes a plurality of visit listings corresponding to at least one of the webpages in the portion where the plurality of visit listings are presented within the browser history of the web browser and the history cluster listing further includes an action control configured to resume a previous search associated with the plurality of visit listings. In some implementations, the metadata further includes, for a webpage of the plurality of webpages, determined webpage entities, a plurality of related searches, and a dwell time on the webpage.

In some implementations, the history cluster is generated as output of a model (such as a machine learned model or clustering algorithm) executing on the computing device and using the metadata as input. In some implementations, the metadata further includes webpage identifiers defined for the webpages in the portion, the webpage identifiers indicating whether the respective webpage in the portion is part of a tab group, a bookmark, or a search results page accessed by the computing device. In some implementations, the generated engagement scores include respective engagement metrics for the webpages in the portion where the respective engagement metrics are used for selecting a prominence level with which to display, in the history cluster listing, snippets for at least one webpage of the plurality of webpages in the portion.

In some implementations, generating the repository of metadata further includes de-duping the plurality of webpages accessed and saved in the browser history. The de-duping includes determining duplicative webpage accesses in the plurality of webpages accessed, selecting, for the duplicative webpage accesses, a webpage with a latest access timestamp with respect to access timestamps associated with the determined duplicative webpage accesses, and generating, for the webpage with the latest access timestamp, the metadata for storage in the repository. In some implementations, the history cluster has a title and the operations further comprises displaying the title as a suggested link and selection of the link issues the request to view the history cluster.

The systems and aspects above may be configured to perform any combination of the above-described aspects, each of which may be implemented together with any suitable combination of the above-listed features and aspects.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

FIGS. 4A-4C are example user interfaces illustrating an example of accessing a history cluster listing, in accordance with implementations described herein.

FIGS. 5A-5E are example user interfaces illustrating examples of accessing and interacting with a history cluster listing, in accordance with implementations described herein.

The use of similar or identical reference numbers in the various drawings is intended to indicate the presence of a similar or identical element or feature.

DETAILED DESCRIPTION

Figure 1:
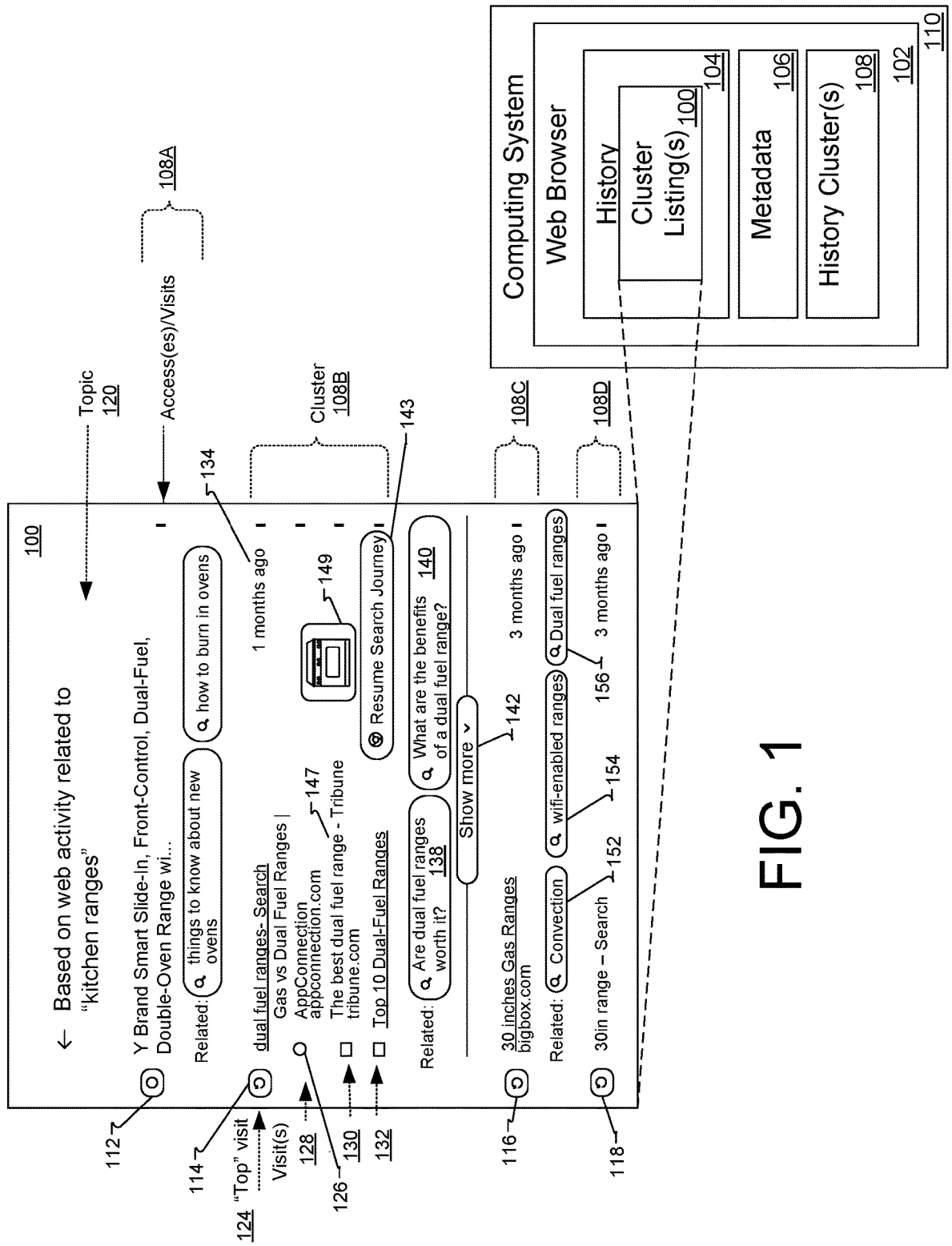
FIG. 1 is a block diagram illustrating an example history cluster listing user interface (UI), in accordance with implementations described herein.

This document describes a browser history organizing tool that may generate history cluster listings which visualize the browser history data into cohesive search journeys. A journey may include searches performed, pages visited, bookmarks created, tab groups created, and/or pages added to tab groups, all related to a particular topic. The visualization of such search journeys may include machine organized and machine categorized webpage content (e.g., images, text, links, metadata, etc.). The machine categorization of the webpage content associated with a search journey may be based on an analysis of search activity for a user (or for a browser), and search activity stored in a search history and/or browser history and pertaining to a particular topic or subtopic that occurs over a particular time period.

The history cluster listings may include one or more user interfaces that are generated by analyzing, clustering, organizing (e.g., categorizing, ranking, scoring, etc.), the browser history data (e.g., activities) to enable a user to easily return to prior search sessions and complete research without having to begin a search again, for example. Machine learning (ML) algorithms are executed on the client/browser side to operate on the browser history data to generate one or more clusters of data. In some implementations, with user permissions, ML algorithms may be executed on a server side (or other remote computing device).

While conventional search history pages may store search history data and/or browser history data for a user to manually review and search, a technical problem with such conventional search history pages is that the search history content is not presented or accessible in a manner that allows a user to assess the data from a search topic and/or search journey point of view. For example, a conventional search history page is generally organized sequentially by access date and time and includes links that are repetitive and optimized for electronic processing, rather than human understanding. Moreover, links related to different search intents are often interleaved temporally, so that links related to one particular user intent (e.g., one journey) are not clearly delineated or sequential in the history page. Thus, there is no practical way in conventional search history views to relate prior searches and page views together around a particular intent, e.g., topic, subtopic, and/or entity, such that the user can see a cohesive search journey and conventional search history pages and/or browser history pages lack any next steps to the search. In addition, there is no practical way to clear a search and/or browser history of a particular topic to help maintain user privacy and security, for example.

At least one technical solution to this technical problem is to analyze and order the data of the search history pages and/or browser history pages using ML models and algorithms. For example, search history data and/or browser history data may be analyzed using one or more ML models, based on user-provided permissions. In addition one or more ML models may also be employed to generate metadata and data to populate Uis, based on metadata input and user-provided permissions. The one or more ML models may be executing in a local web browser or operating system of a computing device executing the browser. The ML models may be trained for search and knowledge base analysis. In some implementations, the ML models may be trained to analyze search and knowledge bases at a server side, for example, if a user of the web browser provides permission to share data with such a server. For example, based on a user permission to do so, the web browsers described herein may access user account data on a server (or remote) computing device as part of a process to generate the history clusters.

The ML models described herein may take browser history data as input in order to produce output (e.g., data for history cluster listings) that may be populated in new Uis or fields of existing Uis accessed in the web browser. For example, the ML models may be used to generate data for populating Uis that are configured to present analyzed and organized browser history data (e.g., history cluster listings) according to particular topics or subtopics and for a user based on an analysis of previous search history data and/or browser history data for the user.

The technical solutions described herein may use search history data and/or browser history data to build a database of user webpage accesses (e.g., webpage visits) and corresponding metadata, any and all of which can be clustered into topical search journeys (e.g., that represent clusters of webpage visits) using on-device ML models. In some implementations, the search journeys (e.g., clusters) can be ranked and indexed for use in presenting search history data and/or browser history data in Uis of the web browser. A user may then search and explore the search history data from within the web browser, from the search history pages and/or browser history page, and/or from a new window, fields, frames, controls, and/or web component configured to present the search history data and/or browser history data. Ranking may include, but is not limited to page ranking, cluster ranking, on device ML clustering, access timestamp ranking, and/or natural language processing query assessments.

The clusters of topical search journeys (e.g., search history data and/or search activities and/or browser history data) may be accessed in response to a user providing permission to use such data and activity information and/or associated data for purposes of generating history cluster listings. For example, if the user does not provide such permissions, a conventional search history pages and/or browser history page depicting sequentially organized webpages according to access date and time may be displayed responsive to the user requesting to view the search history pages and/or browser history page.

In operation, the browser history organizing tool described herein may generate a repository of webpage visits (e.g., accesses) that represent the search history and/or browser history of a web browser. The repository may include metadata that is generated and/or obtained using context-based data and content-based data associated with webpage content, search activity for a user, and access timestamps of the webpage visits. Generally, content-based data is associated with the content that is being displayed, and context-based data is associated with how a user interacts with the content that is being displayed.

The metadata and/or related data may be used to generate history clusters that represent the search journeys for the user. The history clusters may be used to generate and populate Uis for facilitating user interaction with previously performed search activities and/or browsing activities. For example, the history clusters may be used as a basis in which to generate history cluster listings that the user may interact with in the browser to view and assess previously performed searches in an organized fashion according to topic similarity and access timestamp. The history cluster listings described herein may be interactive and accessed to review search data and to continue the search from where the user last viewed content associated with the search.

In some implementations, the repository includes metadata that is generated, scored, and/or ranked, based on ML-based clustering and analysis. For example, the systems and methods described herein may build a database of webpage accesses (e.g., webpage visits). The database may include metadata captured locally and with user permission, as the user uses the web browser. The metadata may include, but is not limited to one or more webpage access timestamps, one or more source events, one or more webpage engagement scores, one or more webpage topics, one or more webpage subtopics, search query input, one or more dwell times on a webpage, determined webpage entities, and/or related search data for any or all accessed web content and/or webpages. In some implementations, the repository of webpage visits may be de-duped to remove repetitive webpage visits to ensure that a webpage with a latest timestamp is retained while repeated visits are deprecated and/or ignored for purposes of generating the history clusters and/or the history cluster listings.

The systems and methods described herein may be widely adapted to a variety of devices including smaller devices, such as mobile devices, tablets, smartwatches, and convertible laptop/tablets, as well as larger devices including laptops, desktops, and the like. In addition, the systems and methods described herein may provide for organized access to search history data by providing multiple history cluster listings and search fields which can allow smaller devices to display access to more content to provide the search content and history cluster listings with increased real estate because any number of history cluster listings may be collapsed for while a single history cluster listing is expanded for the user to focus upon.

The technical solutions described herein may provide a technical effect of improved search activity management as well as improved search content management. This improved management can reduce computational resources used in accessing information from previous activities on the computing system (e.g., device), and facilitate provision of such information in an efficient and secure manner. In addition, the technical solutions described herein may provide a technical effect of improved search and/or browser history content access, a novel UI enabling new functionality and improved UI interactions with the search and/or browser history content. For example, the browser history organizational tool used to generate the history cluster listings described herein may be widely adapted to a variety of devices including small devices such as wearables and mobile devices as well as larger devices including laptops, desktops, and the like to enable a user to quickly find prior searched content and to uncover related content in a logical and often automated fashion via a history cluster listing that includes related searches, related content, proposed additional information, any and all of which may be organized according to topic. In short, the browser history organizational tool described herein may provide for easy access to search and/or browser history content that accurately represents user needs.

FIG. 1 is a block diagram illustrating an example history cluster listing 100, in accordance with implementations described herein. The history cluster listing 100 may be generated based on user activity in a web browser 102. For example, the user activity may include data stored in a history 104, which may include timestamped page or content access data, webpage data, web activity data, and the like. In general, the history 104 may represent a web browser history and/or search history that includes any combination of browser history data, search history data, download history data, cookies, cached data, and any related search activity associated with the web browser. The data stored in the history 104 may be used to generate one or more repositories of metadata 106 and history clusters 108. The history clusters 108 and/or the data in the repositories may be used to generate the history cluster listing 100.

As used herein, metadata (e.g., metadata 106) may include, but is not limited to one or more webpage access timestamps, one or more source events, one or more webpage engagement scores, one or more webpage topics, one or more webpage subtopics, search query input, one or more dwell times on a webpage, determined webpage entities, and/or related search data. Source events may include an event indicating how a user came to access/navigate to a particular webpage (e.g., a source event is an event indicating the source of a webpage opened in a web browser). Example source events may include performed, generated, or accessed queries, bookmarks, tab groups, advertisements, search results pages, search history pages and/or browser history pages or other source webpages, null events or attributes, etc. In some implementations, the metadata 106 may also include or represent one or more actionable next steps for a user based on user searches. In some implementations, the metadata 106 may also include or represent user actions on a particular webpage such as share, voice query, find-in-page, shared highlighting of links, etc. In some implementations, the metadata 106 may include or represent how a user interacted with one or more webpages. In some implementations, the metadata 106 may further include images and associated image data, commercial and/or shopping data. In some implementations, the metadata 106 may include or represent page end reason (e.g., tab closed, browser closed, etc.). In some implementations, the metadata 106 may include or represent page bookmark status, page bookmark timing (e.g., page bookmarked during visit), and/or page added status per the network time protocol.

In some implementations, the example history cluster listing 100 may be presented (or displayed) as part of a search history page and/or browser history page of the web browser 102. For example, the history cluster listing 100 may be provided as an interactive UI nested within a search history listing (search history page). In another example, the history cluster listing 100 may instead be provided as an interactive UI near a conventional search history page or browser history page that lists previously accessed webpages and may be presented without modifying the search history page/browser history page. In some implementations, the history cluster listing 100 may be presented in another location associated with the web browser.

Referring to FIG. 1, a user may access a computing system 110 to perform searches on web browser 102. The web browser 102 may generate metadata 106 and history clusters 108 based on the history 104 and/or other search activity associated with the history 104 of the web browser 102. For example, a repository of metadata 106 may be generated based on a plurality of webpages accessed and saved in the history 104 of the web browser 102. A history cluster 108 including a portion of the plurality of webpages related to a topic can be generated based on the metadata in the generated repository. The web browser 102 may use the metadata 106 and history clusters 108 to score and rank content for display in the history cluster listing 100.

For example, the web browser 102 may generate the history cluster listing 100 based on web activity related to a search (e.g., web activity that involves the topic of kitchen ranges). In some examples, a history cluster listing for a topic can be generated in response to a request to view search activity associated with the topic. The web browser 102 may analyze the history 104 to determine search behavior of the user that generated the data stored in the history 104. For example, the web browser 102 may perform an analysis of the history 104 in order to generate metadata and history clusters representing the data stored in the history 104. In some implementations, the analysis may be performed and stored in real time as the user performs searches, for example. In some implementations, the analysis is performed by an operating system of a computing system 110.

Using the metadata 106 generated from the history 104 of accessed webpages (e.g., webpage visits), the web browser 102 may utilize any number of ML models to generate the history clusters 108. For example, the web browser 102 may use at least the generated metadata 106 as input in order to generate one or more history clusters 108. For example, an ML model may be configured to generate clusters 108 by identifying a first webpage (of some determined portion of accessed webpages) as a top node according to the topic determined to be common to the determined portion. The portion may be determined based on analysis of context-based data and/or content based data associated with the webpages in the history 104, for example. In some implementations, the portion is selected based on a similarity to a particular topic defining webpages (or some similarity to another webpage). The similarity may be used as a basis in which to score the webpages. The webpages may also be scored according to other criteria associated with the metadata, such as access timestamps. The scores may also be assigned to the webpages based on engagement scores for the respective webpage (e.g., a webpage engagement score). The engagement scores may form part of metadata 106, or may be generated separately. The portion may then include the particular webpages that meet or adhere to a particular threshold score.

The ML model may be configured to then assign, based on the metadata 106, webpages of remaining webpages in the portion to particular clusters, which may pertain to the topic or subtopics of the topic, for example. In some implementations, the ML model may also take into account access timestamps for the webpages to ensure that webpages (e.g., webpage visits) that are beyond a particular access timestamp are not selected for a cluster or for display in a history cluster listing 100.

As shown in FIG. 1, the history cluster listing 100 includes a number of clusters 108A, 108B, 108C, and 108D. The clusters each include any number of webpage visits, controls, related searches, links, images, and/or text. For example, the cluster 108A includes a webpage visit 112. The cluster 108B includes a webpage visit, 114 and additional webpage visits 128, 130, and 132. The cluster 108C includes a webpage visit 116. The cluster 108D includes a webpage visit 118. Each webpage visit 112, 114, 128, 130, 132, 116, and 118 correspond to a user visiting (e.g., accessing) a particular webpage during a respective time period. Additional data and/or metadata, such as dwell time, page entities, and the like, may also be considered when generating a particular order of display for the accessed webpages.

Webpage visits (e.g., visits 112, 114, 128, 130, and 132 or other associated webpages of a cluster) may relate to the actual webpage visit stored in the search history of the browser, but may be indicated in the UI as a visit listing. Visit listings may include a webpage, but may also refer to searches, related webpages or content, or other data that may be associated or otherwise determined as relevant to the original webpage visit.

Each webpage visit may pertain to topics or subtopics associated with topic 120 for the history cluster listing 100. For example, each webpage visit 112, 114, 116, and 118, and 128-132 (and/or additional visits not depicted) may correspond to particular matched topics (e.g., topic 120, shown in this example as "kitchen ranges.") For example, a webpage visit 114 may correspond to the topic 120 which may in some implementations match particular portions of keywords of a search query. That is, the web browser 102 may determine that the visit 114, representing a particular webpage access, is a top visit 124 for the history cluster 108B and visits 128, 130, and 132 are visits that also have some similarity to topic 120. In some implementations, the top visit 114 represents a search query, which may be a source event that triggered results and subsequent webpage visits by the user e.g., webpage visits 128, 130, and 132. In this example, if the top visit 124 is the top visit for cluster 108B, then visits 128, 130, and 132 may be nested webpage visits that pertain to the search query source event. Thus, the visits 128, 130, and 132 may be generated by computing system 110 as visit listings that are generated for display in the history cluster listing 100 based on a determined score of each associated webpage visit. Other webpage visits may have occurred with respect to the source event (e.g., top visit 114 associated with cluster 108B), but none of the visits scored high enough to be listed as visit listings representing visit 128, 130, and 132 in history cluster listing 100. In some examples, the history cluster listing can be organized according to the respective scores and can include visit listings associated with the webpages in the history cluster that are determined to have a score that meets a threshold score. Meeting a threshold score means the score satisfies the threshold.

Although the UI content, webpages (e.g., visit listings), and controls shown in history cluster listing 100 generally pertain to the same topic 120, any number of topics may be used to generate clusters for a history cluster listing. Thus, in some implementations, multiple clusters may be generated for multiple topics. Such clusters may be ranked and presented in a history cluster listing based on metadata and/or a user-selected filter or ranking scheme.

The webpage visits of cluster 108B may have been performed according to the time and/or date of access timestamp(s) 134 or generally performed over a time period In general, each visit (e.g., webpage access) includes an access timestamp, but a general range of access timestamps may be depicted in a particular history cluster listing to account for any number of visits that occurred for webpages associated with the history cluster listing. In some implementations, the clusters may include a related access control. For example, an access control 126 may be provided to view additional cluster and/or visit data nested under visit 128. The user may select the access control 126 to expand a list of additional content items pertaining to a topic of the cluster 108B.

In general, the timestamp of a webpage visit selected for a cluster may be correlated to search activity associated with the cluster 108B to ensure that relevant (e.g., recent) data is selected for provision in a visit listing of the history cluster listing 100. This may ensure that stale search content does not show up in history cluster listings generated based on generated clusters.

In some implementations, clusters may include webpages pertaining to additional subtopics or related data, such as related search 138 and related search 140. The related searches 138 and 140 are presented as related to the content, topic, or subtopic of cluster 108B and each includes an access control (e.g., button, link, etc.) to select to retrieve additional content. The history cluster listing 100 may indicate additional queries and/or searches related to the web activity and/or the clusters 108A-D that may be accessed, such as related search 138 and related search 140. In addition, controls to view more content, webpage visits, suggested queries, and the like, may be provided, as shown by control 142.

Although not shown in FIG. 1, any number of history clusters 108 (e.g., 108A-108D) may be generated and depicted as part of the history cluster listing 100. In addition, any number of webpage visits (e.g., depicted as visit listings) may also be generated and/or displayed with such history clusters in a determined hierarchy based on the metadata 106 retrieved from the browser search history data described herein.

Figure 2:
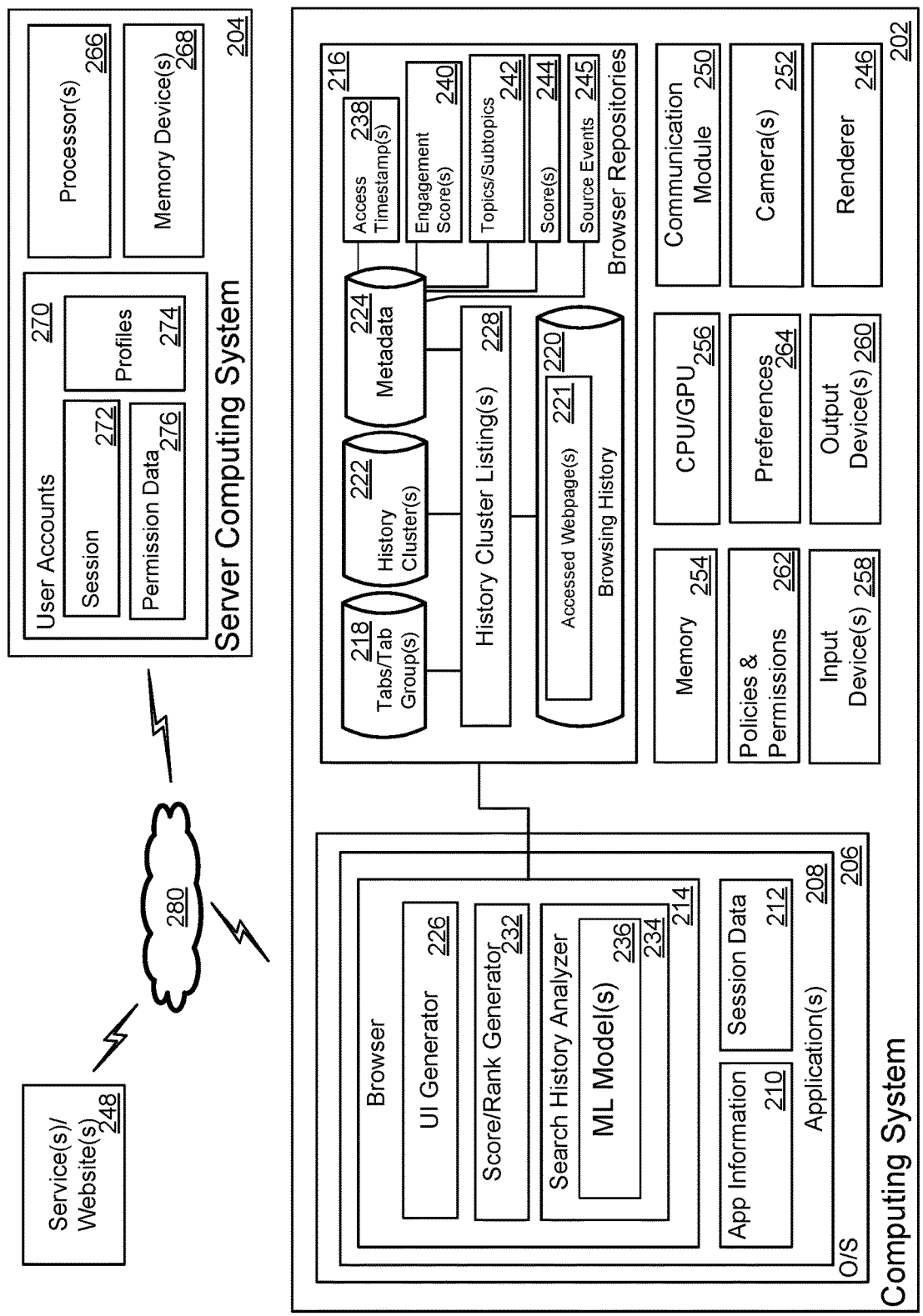
FIG. 2 is a block diagram illustrating an example computing system configured to use search activity data and browser history data to generate and populate user interfaces (UIs), in accordance with implementations described herein.

FIG. 2 is a block diagram illustrating an example system 200 that includes a computing system 202 configured to use search activity and search history data to generate and populate user interfaces (UIs), in accordance with implementations described herein. The system 200 may be used to configure computing devices (e.g., the computing system 202 and/or a server computing system 204), and/or other devices (not shown in FIG. 2) to generate the history cluster listing 100, for example, based on history clusters generated by the computing device depicting the history cluster listing in a web browser.

The computing system 202 may annotate (e.g., using metadata) particular webpages browsed by consumers (e.g., accessed webpages) to ascertain content-based metadata and context-based metadata. The system 202 may then define topics, subtopics, and the like as metadata annotations. The annotations and related webpages may then be clustered into history clusters, which may be de-duped and used as a basis with which to generate history cluster listings according to topics or subtopics, access timestamps for the pages, and/or source events. The history cluster listings may be displayed in UIs and/or fields associated with the web browser.

As shown in FIG. 2, the computing system 202 includes an operating system (O/S) 206 that may execute and or otherwise manage applications 208 based on app information 210 and/or session data 212. The O/S 206 may function to execute and/or control applications 208, UI interactions, accessed services, and/or device communications that are not depicted in FIG. 2. For example, the O/S 206 may allow a web browser 214 to use system 202 resources to execute web browser functionality. The computing system 202 may include one or more modules or engines representing specially programmed software, for example, as recited in the algorithms and methods described herein.

The web browser 214 represents a web browser configured to access information on the Internet. The web browser 214 may launch one or more browser processes (not shown) to generate, modify, and/or otherwise configure browser repositories 216. In addition, the web browser 214 may be configured to generate browser content, generate search history data, and/or perform other browser-based operations.

The web browser 214 may also store browser tabs/tab groups data 218, browser history 220, history clusters 222, and metadata 224.

The browser history 220 may include data representing user activities within a web browser. For example, the browser history 220 may include previously accessed webpages 221 accessed in the browser 214. The browser history 220 and accessed webpages 221 may be presented on a search history page and/or a browser history page of the browser. The search history page and the browser history page is generally organized sequentially by webpage access date and timestamp and includes links that are repetitive and optimized for electronic processing, rather than human understanding.

Using the browser history 220, a search history analyzer 234 may retrieve and/or generate particular data using the browser history 220. For example, the analyzer 234 may obtain (and/or generate) metadata 224 from the browser history 220. In some implementations, the metadata 224 may be generated based on the browser history 220 and/or another database available to the web browser 214. As shown, the metadata 224 includes access timestamps 238, engagement scores 240, topics 242 (and subtopics), scores 244, and source events 245.

In general, the search history analyzer 234 may execute in the web browser 214 using one or more browser processes (not shown). The analyzer 234 may utilize metadata 224 to generate content-based annotations (e.g., metadata based on content) and context-based annotations (e.g., metadata based on context). For example, the content-based annotations may include a category of a particular webpage (e.g., for non-local public or private webpages). The content-based annotations may also include an indication that a webpage contains particular content (e.g., user data, public data, particular types of data, etc.). The content-based annotations may also include an indication of which entities are associated with (or on) the webpage. Content-based metadata represents information describing actual content (e.g., images, text, symbols, etc.) on a webpage or particular topics or subtopics describing the webpage. Context-based metadata represents information describing how a user engaged and/or otherwise interacted with the webpage.

In general, content-based annotations may be obtained using a document object model API to retrieve, via a browser process, page content associated with webpages visited by the user. In some implementations, ML inference tasks may be executed to annotate output from the API and to update the history clusters 222 as annotation tasks are completed. As used herein, history clusters 222 may include search history clusters, history clusters, or other clustering of browser data pertaining to user interaction in the web browser 214.

In some implementations, the context-based annotations may include URL-keyed anonymized data that is obtained from the web browser 214, based on user permissions to access such data. The data may include URLs of webpages a user visits. Additional context-based annotations may also include indications of tab group status (e.g., whether a webpage is in a tab group and a timestamp of when the webpage was placed in the tab group). Context-based annotations may also include an indication for whether a particular webpage is a bookmark, a favorite bookmark, an often accessed bookmark, or a new bookmark. Context-based annotations may further include an indication for whether a particular webpage is a shortcut, an often accessed shortcut, or a new shortcut. Context-based annotations may also include an indication of a duration since a last visit to a URL associated with a particular webpage or bookmark. The context-based annotations may be obtained using the browser history 220, and ML models that cluster the browser history 220 according to topic, subtopic, scores, source event, webpage access timestamps, or other obtained metadata 224, and/or any combination of the above.

Context-based annotations or metadata can also include context signals which indicate how a user navigated a webpage. In some implementations, the context-based annotations (e.g., metadata) may be generated based on clipboard actions associated with the web browser 214. For example, the web browser 214 may be configured to monitor for explicit copy operations (e.g., Ctrl-C or other input to trigger a copy operation). For example, the web browser 214 may detect a copy action is invoked in a URL toolbar, in a document within the browser, in a search field, and the like. In some implementations the web browser may monitor to detect share operations that may expand beyond a copy to the clipboard. For example, the web browser 214 may detect sharing of web content via upload, link share, print, text message, and the like. Context signals may also indicate scrolling or resizing of the webpage being viewed, for example.

The content-based annotations and the context-based annotations may be used by analyzer 234 to generate a descriptive search journey (e.g., to generate one or more history clusters 222) for a particular search session, a user, a topic, and/or for several search sessions. Portions of the search journey and/or metadata associated with the search journey may be used as a basis in which to generate content for the history cluster listings 228. That is, the history cluster listings 228 are generated based on clusters 222, which are generated based on the metadata 224 (e.g., content-based annotations and the context-based annotations).

A search journey may include any or all of particular topic-centric user activities in a web browser, such as searches performed, pages visited, bookmarks created, pages added to tab groups, and the like. For example, a search journey may include user activities performed that are determined to be associated with a particular topic (or subtopics) where the activities are performed within a predetermined timespan in which a user may return to and resume searching the topic or subtopics.

The search history analyzer 234 may determine that a browser history 220 pertains to a number of particular topics. Each of the topics (and/or related subtopics) may be used to organize previously visited webpages. That is, the aspects of a search journey (i.e., topic-centric user activities in a web browser) for a topic may be used to generate a visually appealing cluster of related webpage visits (e.g., accesses), UI data, and controls for accessing information about the topic. The search history analyzer 234 may generate such clusters 222 using ML models 236. The score/rank generator 232 may be used to organize the webpages within the cluster 222. Any number of topics may be represented in the browser history 220 and thus, analyzer 234 may generate any number of history clusters 222 based on such topics. In some implementations, multiple clusters 222 may be generated for multiple topics. Such clusters may be ranked and presented in a history cluster listing.

In some implementations, the search history analyzer 234 can employ one or more ML models 236 to automatically analyze conventional search history data (e.g., browser history 220) into history clusters 222, which may be used to relate previously performed searches and page views/visits together around a particular topic, subtopic, and/or page entity, such that the user can be presented a cohesive search journey and any next steps to the search. The presented cohesive search journey and next steps may take the form of a search history UI, such as the history cluster listing 100. The browser repositories 216, in general, may be used in any combination, with user permission, to generate history clusters 222 and any resulting history cluster listings 228 based on the history clusters 222.

For example, with user permission, the system 200 may generate history clusters 222 that may represent a search journey performed on web browser 214. The history clusters 222 may be generated based on the browser history 220 collected by the web browser 214 and/or other data obtained from (or generated for) browser repositories 216. The history cluster 222 may represent the basis on which one or more history cluster listings are generated and displayed to the user of computing system 202.

In some implementations, the history clusters 222 are generated as output of one or more ML models 236 executing on a local computing device. The ML models 236 may use the metadata 224 as input. The ML models 236 may be configured to identify a first webpage in a portion as a top node according to the topic and may assign, based on the metadata, webpages of remaining webpages in the portion to subnodes (e.g., webpages in a particular cluster that is identified as related to the top node or top visit).

Generating the history clusters 222 may include identifying and grouping accessed webpages 221 (e.g., from the browser history 220). For example, the accessed webpages 221 may be grouped based on a determined similarity to a topic, a top cluster node, or metadata 224 associated with one or more of the accessed webpages 221. For example, the computing system 202 may iteratively process the metadata 224 associated with each individual webpage access/visit.

In some implementations, history clusters 222 may be generated by one or more of the ML models 236 using entity tagging to attach a vector of keywords (e.g., topics, subtopics, entities on page, etc.) to each cluster. These keywords may be utilized as metadata and thus may not be provided for user view, but may be used to generate clusters 222. For example, the ML models 236 may be configured to compute entities that are determined to be included (or probabilistically determined to be included) in particular webpage content.

Page entities may be an example of a metric used to generate UI content (e.g., history cluster listing content) relevant to user search sessions when the user wishes to return to the session and continue searching the topic and/or subtopic. Because users typically accomplish tasks in a web browser across multiple sessions (e.g., days, weeks, etc.), using knowledge about web page entities for particular webpages may result in accurate clustering of webpage visits. For example, instead of a user having to remember the title of a particular webpage that was previously visited, the user may be able to enter a query about an entity of the page, which may provide an improved visual and content-based experience to the user and enable the system 202 to connect search journeys across multiple browser sessions. The connected search journeys may be used to generate history cluster listings that assist the user in reviewing previously searched content as well as assess additional related subject matter and next steps in the search.

In operation, the system 202 may obtain metadata for identified entities of one or more webpages accessed (e.g., webpage visits), according to the browser history 220. For example, the system 202 may retrieve an entity name and categories to which the entity belongs for any of the webpages accessed. Similar to annotating documents with entities for a knowledge graph, the system 202 may annotate webpage entities of visited webpages locally in the web browser 214, as described in detail above. One or more ML models 236 may use the entity metadata as well as any other metadata to generate clusters of webpage accesses.

In some implementations, the ML models 236 may employ any number of neural networks (not shown) to carry out machine learning tasks onboard the system 202. The neural networks may be used with ML models 236 and/or operations to predict and/or analyze search history data to generate and/or update search clusters In some implementations, the processing tasks associated with webpage visits and metadata are referred to as machine learning (ML) inference operations. An inference operation may refer to a processing operation, step, or sub-step that involves an ML model that makes (or leads to) one or more predictions. Certain types of processing carried out by system 202 may use ML models to make such predictions. For example, machine learning may use statistical algorithms that learn data from existing data, in order to render a decision about new data, which is a process called inference. In other words, inference refers to the process of taking a model that is already trained and using that trained model to make predictions. Some examples of inference may include topic or subtopic recognition, web page activity recognition, and/or perception of such webpage activity or user activity with respect to the webpage.

In some implementations, a ML model includes one or more neural networks. Such networks may transform an input, received by an input layer, through a series of hidden layers, and produce an output via an output layer. Each layer is made up of a subset of the set of nodes. The nodes in hidden layers are fully connected to all nodes in the previous layer and provide respective output(s) to all nodes in the next layer. The nodes in a single layer function independently of each other (i.e., do not share connections). Nodes in the output provide the transformed input to a requesting process. In some implementations, the networks utilized by system 202 include convolutional neural networks, which is a neural network that is not fully connected.

In general, system 202 may employ networks and classifiers (not shown) to generate training data and to perform ML tasks. For example, the processors 256 may be configured to execute a classifier that determines whether or not particular webpages pertain to topics or subtopics and whether or not such webpages may be combined and/or selected to be presented with particular history cluster listings. In addition, the processors 256 may be configured to execute a classifier that also determines whether or not particular webpages belong to a cluster based on the topic/subtopic or based on other metadata associated with the particular webpages. The ML models 236 may include at least candidate generation, ML confidence ranking, heuristic scoring, and metadata analysis. For candidate generation, the system 202 may use a predefined set of entity names hashed together in machine readable code. The system 202 may then perform substring matching to particular webpage visits to determine potential annotations for the webpage visits.

After completing the candidate generation, the system 202 may transmit the candidates and the hashed entity names to an ML model to calculate confidence scores for the candidates. The ML model may be trained using a public web corpus on a timeframe (e.g., daily, weekly, monthly, etc.), for example. The content from the corpus may be reannotated with new information and/or labeling if such information is determined from the assessment while training. After the confidence scores are determined, any number of heuristics scoring can be applied to disambiguate similar annotations, for example.

The confidence scores may enable the ML model (or the browser 214 and/or O/S 206) to rank the webpage visits with respect to particular metadata and/or heuristics scores. In some implementations, additional classifying may occur. For example, the browser 214 may classify entities of page content on the accessed webpages from the browser history 220. In some implementations, the web browser 214 may, for each webpage visit (e.g., access), add a new annotation field that indicates entities, keywords, topics, subtopics, and the like. Such annotations may be stored locally on computing system 202 associated with the browser 214.

The annotations (e.g., metadata 224) may then be used to generate the history clusters 222. For example, the ML model 236 may retrieve a localized category and entity names for each of the webpage identifiers (e.g., access timestamps of page visit(s)) determined to be clustered. The category, entity names, and webpage identifiers may be used as input to the ML model 236 to determine a similarity of entities between different webpage visits within a cluster 222, as well as similarities between clusters in order to group particular clusters (and/or related content) together. The determined categories and entities may be stored locally on computing system 202 associated with the browser 214. The clusters may then be queried for and data of the clusters 222 may be surfaced to various UIs associated with the browser. In some implementations, the ML model 236 may use any or all signals of the metadata 106, as described throughout this disclosure.

One ML task that the ML models 236 may perform is to utilize obtained and/or generated metadata based on browser history 220 to generate the history clusters 222. Each cluster 222 represents a number of webpage visits (e.g., accessed webpages 221). The ML models 236 may obtain (or generate) metadata 224 and may use the metadata 224 as input to one or more of the ML models 236 to make determinations about webpage content and webpage context. For example, the system 200 can determine topics (e.g., keywords, categories, etc.) that pertain to a webpage. In addition, the system 200 may determine context features that indicate activity or recency of access for the webpage. For example, the metadata 224 may include access timestamps for one or more webpages and engagement scores for interaction with one or more webpage. The engagement scores may be calculated for each page. In some implementations, a total engagement score can be calculated using all engagement scores pertaining to a particular topic or subtopic. In addition, a number of page loads in a time period surrounding a particular webpage visit may also be calculated. A number of unique URLs visited in a particular time period may also be determined.

In some implementations, the ML models 236 may be trained using data collected based on user permissions, using URL-keyed metrics. Actual processing of the data (e.g., webpage accesses, browser search input, search history data) may be performed on the local computing system 202 to ensure the data is secure and private. The ML models 236 are generated to perform based on particular topical relevance and browser behaviors according to particular platforms or device types.

In operation, the search history analyzer 234 may generate each history cluster 222 by analyzing search journey data such as webpage accesses (e.g., visits), related search queries to searches performed, tab group status for a particular webpage visit, and/or bookmark status for a particular webpage visit. In general, each history cluster 222 may represent a portion of any number of accessed webpages 221 in the browser history 220. The portion of webpages may be defined and/or organized according to topic, subtopic, and/or access timestamp.

In some implementations, the ML models 236 may perform clustering in an on-demand fashion (e.g., in real time) in order to generate up to date clusters based on the browser history 220 and/or related data. As such, when a user accesses a history cluster listing, the system 202 may retrieve cluster content to populate content (e.g., cluster 108B in the history cluster listing 100, for example). In addition, as a user scrolls to view more content, additional clusters are obtained and are used to populate additional clusters. As the list of clustered content is populated in a history cluster listing, the clusters may include webpage visits that were accessed at a later time than the first cluster listing (e.g., cluster 108B) in the history cluster listing 100, for example. This real time approach can reduce processing resources which may be used to perform clustering at regular intervals in the background. Use of computational resources may therefore be improved.

In some implementations, the additional webpage visits are obtained in response to a request to view additional content (e.g., a scroll, a show more control, etc.). The ML models 236 may then generate the clusters in real time based on the obtained webpage visits. In some implementations, the generated clusters are not persisted when the user navigates away from the history cluster listing. This may reduce demand on data storage capacity, which can be limited on mobile computing devices. In some implementations, the generated clusters are persisted based on a user request (or permission) to do so.

In some implementations, the ML models 236 are executed by a browser process of the web browser 214. For example, each ML model 236 may retrieve metadata and/or related data associated with browser history 220. The retrieved metadata and/or related data may include text and/or images which may be parsed, split into words based on whitespace, for example, and then tokenized. Each word is compared against a fixed size dictionary of words and mapped to a predetermined unknown token. A vector of integers of a fixed size may then be determined and used as input to the ML model 236. The output of the model 236 may include a vector of a fixed size based on a number of categories that the model 236 was trained on.

Each webpage visit may be analyzed in this fashion according to webpage content and context in order to generate, on-device (e.g., on computing system 202), new metadata for storage with metadata 224. An anonymized version of the new metadata may be used as training data for future model iterations. In some implementations, collecting such data does not occur for incognito browsing sessions. In addition, users have options to delete such on-device data by clearing the browser history.

In some implementations, the history cluster listings 228 may depict clusters 222 in a reverse chronological order based on access timestamps and/or a range of access timestamps. The history cluster listings 228 may be presented in the browser 214 with other UI controls including, but not limited to search toolbars, page links, menus, and the like. If a user wishes to search for a particular cluster 222, a search toolbar within or near the history cluster listing 228 may be used to enter keywords in which can be matched to clusters 222 in order to retrieve (or generate) a particular history cluster listing 228.

In particular, history clusters 222 may be generated by one or more models 236 using entity tagging to attach a vector of keywords (e.g., topics, subtopics, etc.) to each cluster. When a user searches for a query in the UI of a history cluster listing 228 or from within a search history page, within a browser history page, and/or within a search toolbar, the system 202 may use string tokenization and exact and/or prefix string matching against a predefined list of keywords to find clusters that include such keywords. In some implementations, a tokenized query can also be matched against the URLs of a particular cluster 222 and/or respective titles associated with the clusters 222. Partial string matching, fuzzy logic string matching, and/or other matching techniques may be used. In addition, additional metadata beyond keywords may also be used to assess matching to particular clusters.

In some implementations, performing the ML models 236 locally in the browser may ensure the user can manage a browser history 220. Unlike conventional systems, the UIs (e.g., history cluster listings depicting clusters) generated by the system 200 (e.g., system 202 or system 204) are configured to group and organize webpage visits (e.g., accesses) to allow the user to access a curated UI that can be used to delete groups of navigations quickly. This feature may provide the functionality of precise deletion of portions of a search history without having to manually find and delete webpage visits one by one, as in conventional browser and/or search history webpages. For example, selection of a related action control for the history cluster listing can cause performance of an action of deleting the search history and/or browser history of the associated cluster. Facilitating deletion of precise portions of such histories can improve user privacy and security, particularly in instances where other users may have access to the same computing system.

In some implementations, the ML models 236 are executed by server computing system 204 if the user provides permission to utilize browser history 220 on a remote device, such as server computing system 204. For example, if the user provides permission to share data across user accounts by saving data on a cloud server or other server device, the system 200 may obtain a full browser search history for the user account because system 200 can store browser history data remotely. The remote browser search history may be obtained on demand and merged with a local browser search history if the local history. In some implementations, the remote browser search history is updated periodically with the local browser search history and thus a merge is not performed.

At some point, a user may request to view a search history (or a portion of a search history). The system 200 may generate any number of history clusters 222 based on the browser history 220 (local and remote) and may use the clusters 222 to generate history cluster listings 228. For example, the system 202 may use ML models 236 locally on system 202 to generate the clusters 222, which can be used to populate history cluster listings 228. The history cluster listings may be displayed to the user in response to the request. In some implementations, the server computing system 204 may instead use ML models at the server side to generate the clusters and/or history cluster listings and to transmit the history cluster listings to the user in response to the request.

Each history cluster 222 may include a determined top webpage visit (e.g., a top node) that represents a highly salient visit within the cluster 222. The top node may be determined by the search history analyzer 24 and the score/rank generator 232, for example, and may function to represent the cluster. For example, the top node may be a node to which other webpage visits (e.g., accesses) are mapped to. If the top node represents a topic, the mapped webpage visits may represent the same topic or a subtopic. In some implementations, the top node is a listing in the history cluster listing 228 that is presented with prominence while the remaining webpage visits of a portion of webpages are nested and/or indented from the top nodes. The nested and/or indented webpage visits may represent related webpage visits.

The top node may be determined based on a score 244 generated for each webpage visit. The scores can be based at least in part on access timestamps and generated engagement scores for the respective webpages. The score 244 may be generated using the ML models 236, for example. The score 244 for a particular webpage visit may be calculated based on the metadata 224 including, for example, a determined engagement with the webpage during the visit (e.g., an engagement score 240 representing how long a webpage tab was in the foreground). Additional heuristics may also be used to identify the top node. For example, a navigation graph may be generated and assessed in combination with respective engagement scores 240 of spokes of the graph. In some implementations, the scores 244 are based on the access timestamp 238 of the webpage visit and the metadata 224. For example, using the access timestamp 238 to score particular webpage visits may ensure that recent visits to a webpage may be scored higher than less recent visits to the webpage. This may improve any resulting history cluster listing 228 based on a particular cluster 222 by avoiding use of outdated or less relevant (based on a timestamp) website visit.

Upon generating and assigning scores 244 for the webpage visits, the score/rank generator 232 may rank the webpage visits that pertain to a particular topic and/or subtopic according to the score 244. For example, the webpage visits within a history cluster 222 in descending order based on the respective scores 244 of the visits. For example, the highest scoring webpage visit is selected as the top webpage visit (e.g., a top node) while the remaining webpage visits are identified as related webpage visits. In some implementations, the UI generator 226 may be triggered to hide particular related webpage visits based on a score being below a predefined threshold. In some implementations, the UI generator 226 may be triggered to hide particular related webpage visits if such visits are below a particular ranking in order to reduce clutter in the resulting history cluster listing 228, for example. A user control may be provided by UI generator 226 within or near content in a history cluster listing to allow a user to toggle such hidden webpage visits into view.

Source events 245 may include an event indicating how a user came to access/navigate to a particular webpage. Example source events 245 may include performed, generated, or accessed queries, bookmarks, tab groups, advertisements, search results pages, search history pages or other source webpages, null events or attributes, etc. Such source events can be used in generating a history clutter. For example, same or similar source events may be a indication that webpages related to a topic should be included in a history cluster.

The ranked webpage visits may be assessed by search history analyzer 234 to generate a history cluster listing 228 for view in the browser. For example, the search history analyzer 234 may generate a history cluster listing 228 for a particular history cluster according to one or more determined subtopics and/or the access timestamp 238 associated with particular webpage visits (e.g., accesses) in the cluster. The history cluster listing 228 may include webpage visits associated with the cluster and determined to have a score that meets a threshold score. In addition, the history cluster listing 228 may also include a number of search history events corresponding to the webpages (e.g., webpage visits/accesses) of the history cluster listing. Example search history events may include search results, portions of search results, images responsive to entered search queries, related search recommendations, related search queries, summarized search results, summarized webpage visits, etc.

In some implementations, the search history analyzer 234 may de-dupe webpage visits. For example, the webpage visits associated with a particular cluster may be represented in metadata 224 even if a particular visit is de-duped (e.g., duplicate content removed from UI view). For example, while metadata for duplicate content is retained in metadata 224, the system 200 may de-dupe webpage visits (e.g., accessed webpages 221) that are saved in the browser history 220. The de-duping may include determining duplicative accessed webpages 221 in the plurality of accessed webpages (i.e., within browser history 220). In some implementations, the accessed webpages 221 represents the search history of the web browser 214 including a list of all webpages accessed over a time period.

Next, the system 200 may select, for the duplicative webpage accesses, a webpage with a latest access timestamp with respect to access timestamps of the determined duplicative webpage accesses in order to generate, for the webpage with the latest access timestamp, the metadata 224 for storage in the repository. The de-duped content may remain stored, but may not be utilized for purposes of generating history cluster listings 228. In some implementations, the de-duped content may be removed from the data in the history clusters 222. In some implementations, the de-duped content may be indicated as deprecated content. Any number of clusters may be de-duped in a similar fashion.

In some implementations, the search history analyzer 234 may generate, for each cluster, related search queries. Related search queries may be provided for display in a history cluster listing. For example, the history cluster listing 100 includes a search query pertaining to "dual fuel ranges" at visit 124 with additional related searches 138 and 140 depicted and indicated as related. In some implementations, related search queries may be retrieved from a search result page associated with a particular search query. Such related search queries may be analyzed and stored as metadata 224 in metadata repository and indicated to be associated with a particular webpage visit. When displaying a date associated with the history clusters 222 in a history cluster listing, for example, the related search queries may be either aggregated from multiple webpage visits or selected from a highest ranking webpage visit. Such aggregated and/or selected content may be prominently displayed in a history cluster listing UI, for example, and may be displayed under a determined top node of a particular history cluster. In some implementations and in order to minimize staleness of related search query suggestions, the related searches of a recent webpage visit will supersede related searches of any earlier duplicative webpage visits.

In some implementations, the search history analyzer 234 may also annotate webpage visits according to whether or not the webpage is part of a tab group or bookmark. Such annotations may later be shown in the history cluster listing as a badge or other indicator to assist users in identification of high ranking and/or highly relevant webpage visits in a particular search journey. In some implementations, the annotations may be used to ensure that particular webpage visits are associated with particular clusters 222.

As shown in FIG. 2, the browser 214 includes a UI generator 226 that functions to generate user interfaces, such as history cluster listing 228 in a browser field or as part of a browser frame or webpage. The history cluster listing 228 may represent organized search activity for display in a UI, as shown in example history cluster listing 100 (FIG. 1). In some implementations, the history cluster listings 228 may include analyzed and organized search history information, search results information, search activity information, and related search result information depicted according to determined scores and rankings (e.g., performed by score/rank generator 232) using metadata (e.g., metadata 224) that corresponds to activities performed in the web browser 214, particular browser history 220, and the like. In some implementations, the history cluster listings 228 may be organized in a layout of a UI according to topic and/or subtopic 242, engagement scores 240, timestamps 238, and/or other scores 244.

In some implementations, the history cluster listings 228 may include controls and/or indicators to enable a user to return to performing additional research and/or searches associated with a particular history cluster listing. For example, the system 200 may provide access points represented as UI elements configured to allow reentry to search in a search history page or a browser history page of a web browser. In some implementations, the system 200 may provide access points represented as UI elements configured to allow reentry to search in a browser address toolbar (e.g., or other search control) In some implementations, the system 200 may provide access points represented as UI elements configured to allow reentry to searching in entry points associated with the browser address toolbar (or other search control), and/or menus or controls associated with such entry points. For example, the system 200 may enable search reentry options in a browser menu, a bookmark menu, a tab group menu, etc.

In operation, the UI generator 226 may display data based on performed searches, content item analysis, search history analysis, and/or other processing activities pertaining to the web browser 214. The UI generator 226 may utilize a renderer 246 that may render UI content such as browser windows, browser tabs, search history data, history cluster listings 228, browser tab groups, browser tabs, and content associated with such elements. The renderer 246 may function with a display (not shown) associated with computing system 202, for example, to depict user interface objects or other content to the user of the computing system 202. The renderer 246 may be triggered to render content from UI generator 226, score/rank generator 232, search history analyzer 234, browser 214 or associated browser processes, applications 208, and/or other input or output received by the computing system 202.

In some implementations, the computing system 202 may be executing a browser session and may receive a request to display search activity (e.g., associated with web browser history content). If the system 202 determines that the user accessing the web browser on computing system 202 has provided permissions to access browser history data, the system 202 may trigger the UI generator 226 to obtain particular browser history data and generate and render history cluster listings based on the search data associated with generated history clusters.

For example, the UI generator 226 may request, obtain, and/or receive a history cluster representing webpages accessed and saved in the browser history 220 of the web browser 214. Such webpages may be ranked based at least in part on metadata associated with the respective webpages of the history cluster 222, for example. The UI generator 226 may use the clusters 222 to generate a search history UI, such as history cluster listing 100 or other UI depicting search history data based on browser history 220, for example.

The request to display search activity may be associated with a particular topic and as such, the request may trigger display of the search history UI populated with content, webpages, and search activity pertaining to the particular topic. In some implementations, the search history UI may also be populated with subtopics related to the topic and/or webpages related to subtopic.

In some implementations, the history cluster listing (e.g., history cluster listing 100) is generated and depicted in the search history page of the web browser. In some implementations, the history cluster listing is generated and depicted in a browser history page. The history cluster listing may be populated with at least a portion of the plurality of webpages determined to be related to the at least one topic. For example, visits 128, 130, and 132 may represent previously accessed webpages pertaining to the topic of ranges that are duel fuel, as shown by top visit 124. The visits 128, 130, and 132 may also include webpages nested beneath the visits that represent additional subtopics or webpages that pertain to the visit 128, 130, or 132. Clusters can include other content including, but not limited to visit listings that include any or all of additional webpages, search results, related searches, shopping content, advertisements, etc.

In some implementations, the visits 128, 130, and 132 may represent (or include) visit listings corresponding to the topic and the order in which the visits 128, 130, and 132 are displayed may be based on search history data and/or metadata obtained from the initial webpage visits 128, 130, and 132. In some implementations, the search history data and/or metadata may pertain to a source event related to one or more webpage visit, an access timestamp associated with one or more webpage visit, an engagement score associated with one or more webpage visit, and/or subtopics associated with the at least one topic and one or more webpage visit. In some implementations, the source event may be a click event, a bookmark event, a tab group event, a copy event, an access event, or the like.

The engagement score may include engagement metrics for one or more of the webpages represented in webpage visits (e.g., accesses). The engagement metrics may be used, for example, to determine and/or select a prominence level with which to display, in the history cluster listing 100, snippets (e.g., "Top 10. Dual-Fuel Ranges" of visit 130) for at least one webpage (e.g., "tribune.com") of the plurality of webpages in the cluster 108B or in a portion of multiple clusters depicted in the history cluster listing 100. Engagement metrics can be based on, for example, a foreground duration and/or a background duration of a web page. The duration of time in which a webpage is in the foreground can be used as a proxy for user engagement. For example, engagement scores may be based on a foreground duration. Additionally or alternatively the duration of time that a webpage is open in the background during an active browser session (as opposed to being closed by a user) may also provide an indication of user engagement with that webpage.

In some implementations, the search history data from the browser history 220 may indicate that particular webpages or portions of the webpages belong to a tab group or bookmark of the web browser 214. Such metadata may be used to increase or decrease particular webpage visits and/or cluster content within the history cluster listing.

In some implementations, the history cluster listing also includes one or more action controls configured to resume a previous search associated with the plurality of search results. For example, a control 143 indicates that a user may select the control to resume a search journey pertaining to webpage visit 114 and the "dual fuel ranges" search. Other action controls are of course possible. An action control can be a control button or selectable UI element that is configured to, upon selection, perform an action associated with the history cluster listing.

The UI generator 226 may include and/or access renderer 246, which may be configured to cause display of any generated search history UIs (e.g., history cluster listing 100, filter section 532, dropdown 538, and/or other UI presented with search history data). In some implementations, the search history UIs may be depicted with at least a portion of the plurality of webpages and the search history data ordered based on the metadata.

Figure 6A:
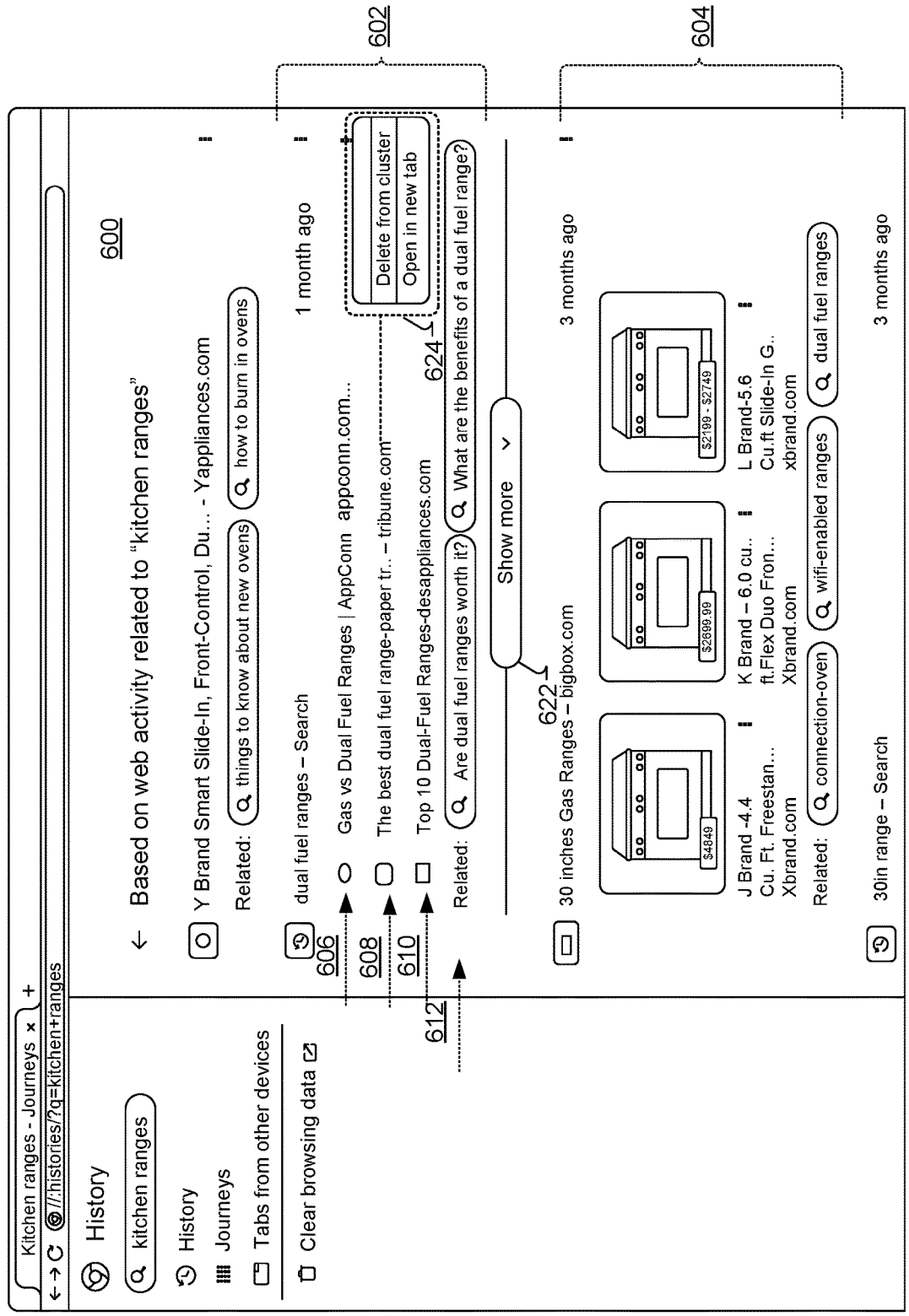
FIGS. 6A-6C are example user interfaces illustrating an example of modifying a browser history by modifying a history cluster listing, in accordance with implementations described herein.
Figure 6B:
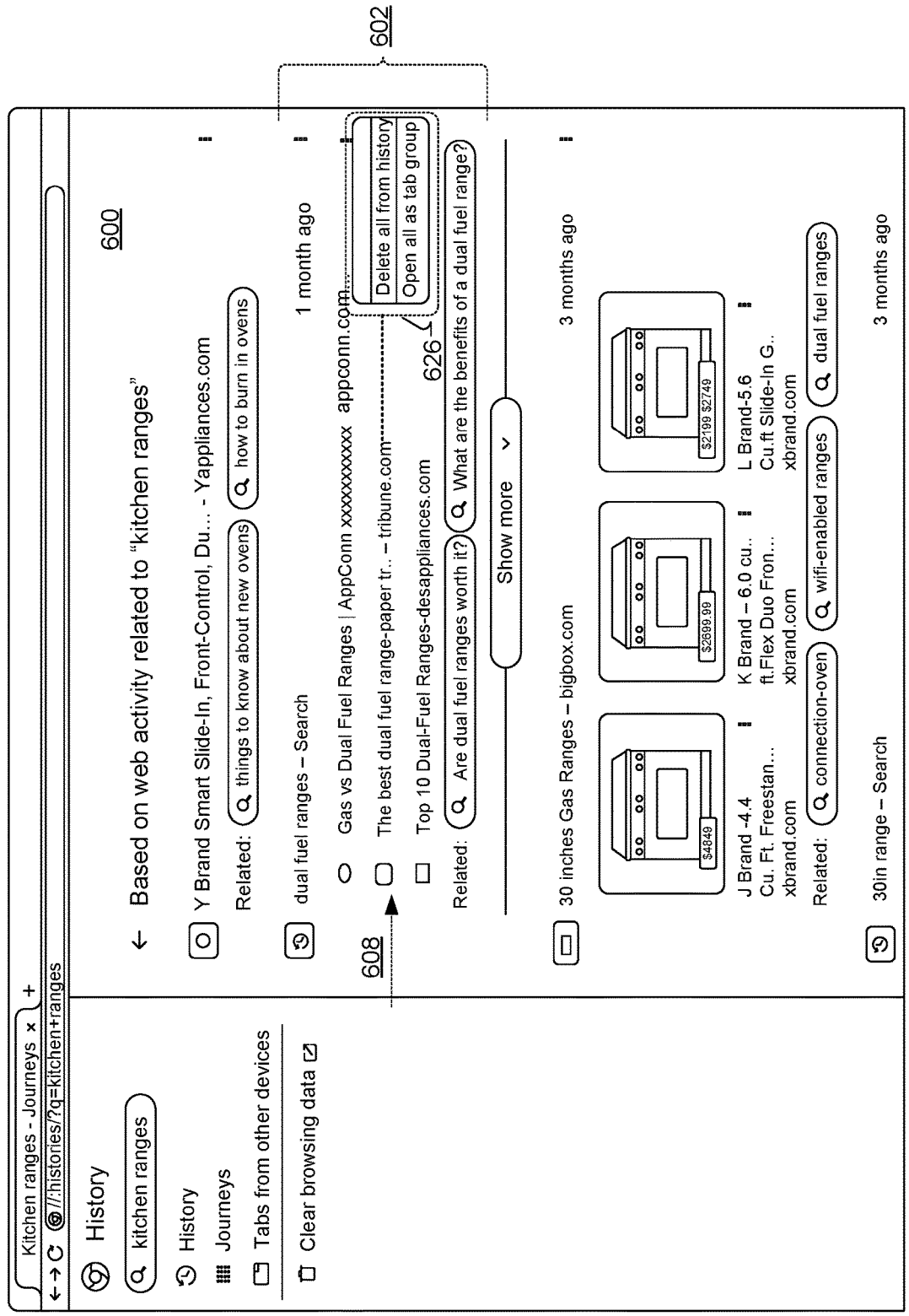
Figure 6C:
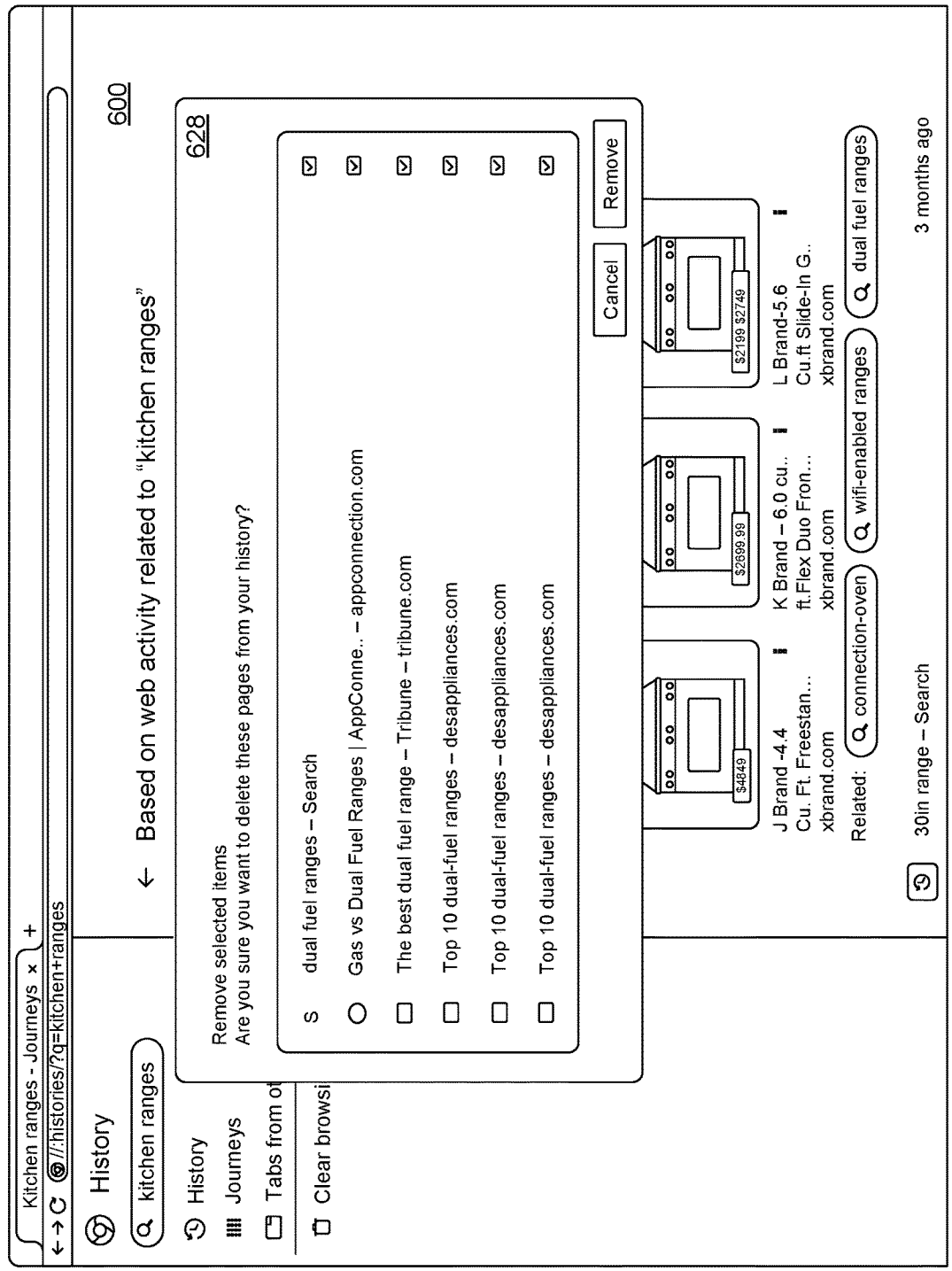

In some implementations, the UI generator 226 may be configured to receive a request to remove a webpage rendered in a history cluster listing and cause, based on the request, deletion of a stored record of access to the webpage from the search history or browser history, as described in detail with respect to FIGS. 6A-6C.

In some implementations, the system 202 be a computing device executing a web browser. The system 202 may include a user interface generator for the web browser. The user interface generator may be configured with instructions to generate a search history user UI (e.g., such as a history cluster listing 100) based on a history cluster (e.g., 108B) related to a topic (e.g., topic 120). The generation of such a cluster may be performed in response to a request, received in the browser, to view search activity associated with the topic. For example, a user may access the web browser 214 and select to view previously performed (by the user) search journeys related to the topic. The history cluster 108B may include a plurality of accessed webpages 221 saved in a browser history 220 of the web browser 214.

In some implementations, the history cluster is generated by system 202 based on metadata associated with webpages in the portion. The metadata may include a source event, an access timestamp, an engagement score, and subtopics associated with the at least one topic. The metadata may be obtained or generated based on information in the webpages of the portion.

In some implementations, the engagement score includes respective engagement metrics for the webpages in the portion, the respective engagement metrics used for selecting a prominence level with which to display, in the history cluster listing, snippets for at least one webpage in the portion.

In some implementations, the search history UI may include a history cluster listing depicted in the search history of the web browser, as shown in FIGS. 4B and/or 5B. In some implementations, the search history UI (e.g., history cluster listing 100) may be populated with at least a portion of the plurality of webpages determined to be related to the topic. For example, the visits 128, 130, and 132 pertain to visit listings that represent webpages that are related to the topic 120 of "kitchen ranges." In some implementations, the portion of the plurality of webpages includes a plurality of visit listings corresponding to the cluster 108B and to search history data from the search history indicating that the portion belongs to a tab group or a bookmark of the web browser.

In some implementations, the search history UI also includes an action control configured to resume a previous search associated with the cluster, as shown by control 143 of FIG. 1. The system 202 may include a renderer configured to cause display of the generated search history UI with the portion of the plurality of webpages and the search history data. In some implementations, the search history UI represents a browser history UI which encompasses search history.

The computing system 202 may also be associated with session data 212, which represents the open browser tabs and browser windows during a single login to the web browser 214. Sessions may be saved and reopened after closing or rebooting the computing system 202 executing the web browser 214. Particular history cluster listings 228 and history clusters 222 may be generated based on the session data 212.

The applications 208 may be any type of computer program that can be executed/delivered by the computing system 202 (or server computing system 204 or via an external service or website 248). Applications 208 may provide a user interface (e.g., a browser application windows, tabs, etc.) to allow a user to interact with the functionalities of a respective application 208. The application window of a particular application 208 may display application data along with any type of controls such as menu(s), icons, widgets, etc.

The applications 208 may include or have access to app information 210 and session data 212, both of which may be used to generate content and/or data and provide such content and/or data to a user and/or the O/S 206 via a device interface. The app information 210 may correspond with information being executed or otherwise accessed by a particular application 208. For example, the app information 210 may include text, images, control signals associated with input, output, or interaction with the application 208. In some implementations, the app information 210 may include data from browser repositories 216.

In some implementations, the app information 210 may include data associated with a particular application 208 including, but not limited to metadata, tags, timestamp data, URL data, tab group assignment data, bookmark assignment data, and the like. In some implementations, the applications 208 include the web browser 214.

In some implementations, the O/S 206 and/or applications 208 may include or have access to services and/or websites 248. The services 248 may include online storage, website/content access, account session or profile access, permissions data access, and the like. In some implementations, the services 248 may function to replace server computing system 204 where the user account data is accessed via a service.

In some implementations, the O/S 206 and/or applications 208 may include or have access to a communication module 250, cameras 252, memory 254, and CPU/GPU 256. The computing system 202 may also include or have access to policies and permissions 262 and preferences 264. In addition, the computing system 202 may also include or have access to input devices 258, and/or output devices 260.

The computing system 202 may generate and/or distribute particular policies and permissions 262 and preferences 264. The policies and permissions 262 and preferences 264 may be configured by a device manufacturer of computing system 202 and/or by the user accessing system 202. Policies 262 and preferences 264 may include routines (i.e., a set of actions) that execute based on a user triggered command. Other policies 262 and preferences 264 may of course be configured to modify and or control content associated with system 202 configured with the policies and permissions 262 and/or preferences 264. In some implementations, permissions and policies 262 may be configured for particular applications, browser tabs, browser tab groups, and input related to such entities.

The input devices 258 may provide data to system 202, for example, received via a touch input device that can receive tactile user inputs, a keyboard, a mouse, a hand controller, a mobile device (or other portable electronic device), a microphone that can receive audible user inputs, and the like. The output devices 260 may include, for example, devices that generate content for a display for visual output, a speaker for audio output, and the like.

The server computing system 204 may include any number of computing devices that take the form of a number of different devices, for example a standard server, a group of such servers, or a rack server system. In some examples, the server computing system 204 may be a single system sharing components such as processors 266 and memory devices 268. User accounts 270 may be associated with system 204 and session data 272 configurations and/or profile 274 configurations according to user permission data 276 based on policies and permissions 262, which may be provided to system 202 at the request of a user of the web browser 214, for example.

A network 280 may include the Internet and/or other types of data networks, such as a local area network (LAN), a wide area network (WAN), a cellular network, satellite network, or other types of data networks. The network 280 may also include any number of computing devices (e.g., computer, servers, routers, network switches, etc.) that are configured to receive and/or transmit data within network 280. Network 280 may further include any number of hardwired and/or wireless connections.

The server computing system 204 may include one or more processors 266 formed in a substrate, an operating system (not shown) and one or more memory devices 268. The memory devices 268 may represent any kind of (or multiple kinds of) memory (e.g., RAM, flash, cache, disk, tape, etc.). In some examples (not shown), the memory devices 268 may include external storage, e.g., memory physically remote from but accessible by the server computing system 204. The server computing system 204 may include one or more modules or engines representing specially programmed software.

In general, the computing systems 202 and 204 may communicate via communication module 250 and/or transfer data wirelessly via network 280, for example, amongst each other using the systems and techniques described herein. In some implementations, each system 202, 204 may be configured in the system 200 to communicate with other devices associated with system 200.

Figure 3:
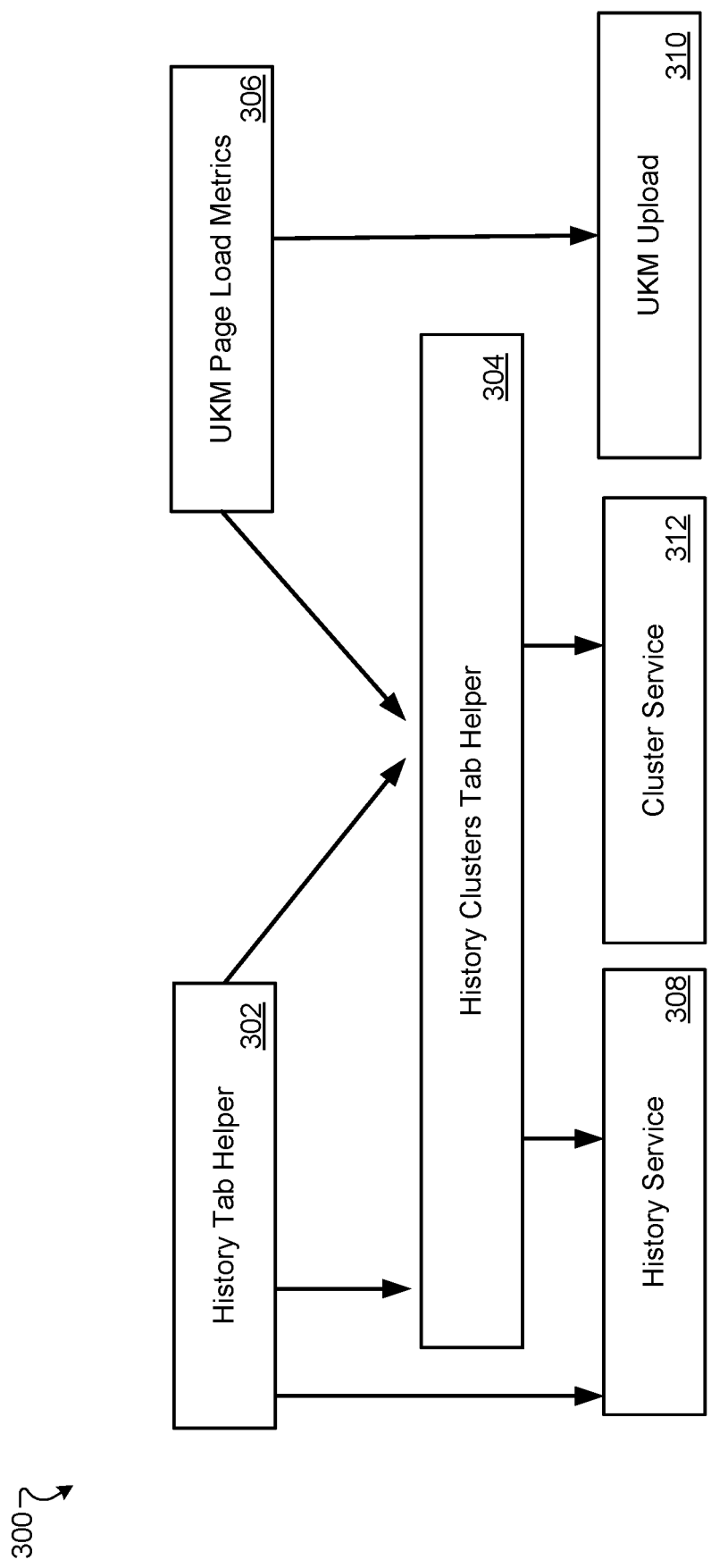
FIG. 3 is a flow diagram illustrating an example of obtaining and analyzing web browser history data for use in generating history clusters, in accordance with implementations described herein

FIG. 3 is a flow diagram 300 illustrating an example of obtaining and analyzing web browser history data for use in generating history clusters, in accordance with implementations described herein. In particular, flow diagram 300 may depict an example of obtaining the browser history 220 in order to generate the metadata 224. For example, the flow diagram 300 may collect context-based annotations and content-based annotations.

The context-based annotations may be obtained using the browser history 220, and ML models that cluster the browser history 220 according to topic, subtopic, and/or metadata 224. Content annotations may use document object model content to retrieve and/or annotate webpage content using a browser process to execute further computations. For example, a page content annotations service may execute low-priority ML inference tasks in order to annotate content retrieved from the document object model. The annotated content may be used to update webpage visits in a history service repository (e.g., stored in the history clusters 222, and/or metadata 224 repositories).

Context-based annotations may be obtained based on the browser history 220 and/or obtained from an application programming interface (API), such as a URL-keyed anonymized data (UKM) API. In operation, the flow diagram 300 may begin with a history tab helper component 302 notifying a history clusters tab helper component 304 about a new detected webpage visit (e.g., access) associated with the web browser 214. In addition, the history clusters tab helper component 304 may access and/or otherwise receive UKM page load metrics 306.

The history clusters tab helper component 304 may then record page-start metrics associated with the accessed webpage and may log an incomplete visit until page-end metrics are detected and stored. Once a lifetime of the webpage ends (e.g., a user navigates away from the accessed webpage), the history clusters tab helper component 304 is requested to record the page-end metrics. Upon recording the page-end metrics, the history clusters tab helper component 304 may log the page-end metrics to a history service component 308. In addition, the UKM page load metrics 306 may be uploaded to a UKM upload component 310 as part of a page load event, for example. The history clusters tab helper component 304 may also trigger a cluster service 312 to store such metadata (e.g., and persist the metadata locally on device) the page load event and data metrics.

The history clusters tab helper component 304 may function to execute logic associated with ML models 236 and analysis on device in order to generate history clusters 222. The logic may utilize one or more ML models 236 to identify groups of webpage accesses that are similar using one or more algorithms to iteratively process the 224 metadata associated with each individual page load to construct the clusters. In general, clusters can cover similar topics, but be focused on different portions of the topics (e.g., tomatoes vs. vegetable garden). Performing the analysis on device can help ensure that user data and/or related content is kept private, as well as reducing the use of network resources as compared to off device processing and cluster generation.

In some implementations, the search history analyzer 234 iteratively processes the metadata 224 associated with each individual webpage load to construct an indexable set of clusters of the webpage accesses. The analysis and clustering may be executed periodically (e.g., every x page loads or every y hours) in a background process of the web browser 214, for example.

In some implementations, a visit identifier (e.g., an access timestamp) may be used to associate context signals with particular webpages. The history clusters tab helper component 304 can obtain the access timestamp for the accessed webpage from the history service component 308. Such page metadata and access timestamps may be stored on device in as metadata 224 and may be keyed according to the access timestamp (e.g., visit identifier).

Figure 4A:
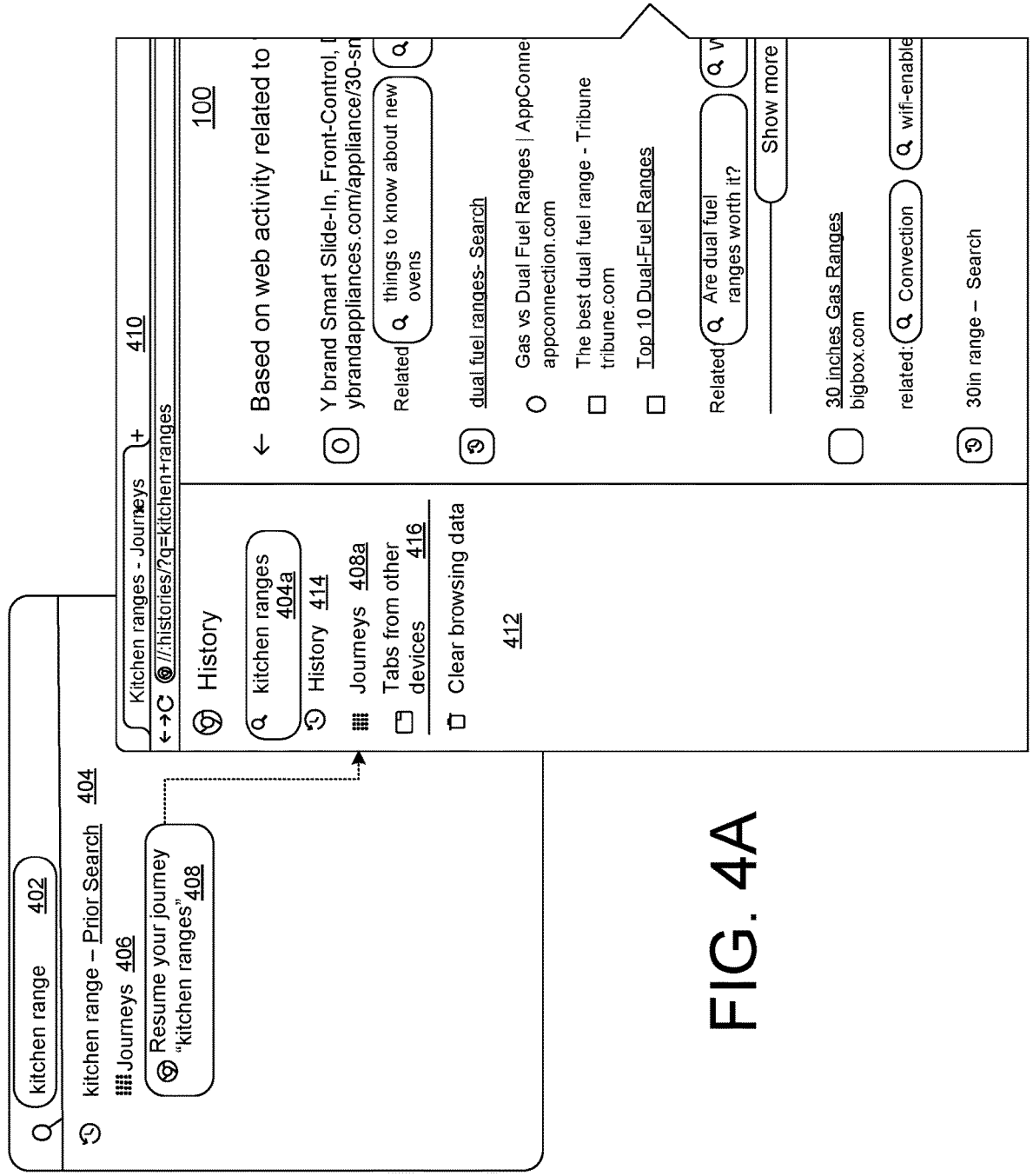

FIG. 4A is an example user interface illustrating an example of accessing a history cluster listing, in accordance with implementations described herein. The user may access information (e.g., history cluster listings 100) that may be presented as one or more UIs depicting an organized search journey based on one or more generated history clusters 222. At some point, the user may wish to continue a search journey or may wish to review prior search data. To do so, the user may access the browser 214 and may enter one or more keywords that may pertain to a prior search. For example, FIG. 4A depicts an example search box 402 in which a user entered a search query "kitchen range." The system 202 may receive the search query and may determine whether or not any of the query terms match keywords associated with previously searched query terms. In some implementations, the system 202 may also determine whether or not any of the query terms match keywords and/or content in the browser history 220.

In the example of FIG. 4A, the system 202 determined that a prior search 404 was performed for search query "kitchen range." The user may be provided a link to select the prior search in order to rerun the search. The system 202 may also provide any search journeys 406 that may match such search terms from the browser history 220. As shown, a single search journey control 408 is provided as an option for the user to select to resume the search journey for "kitchen ranges." In some implementations, the journey "kitchen ranges" represents a topic generated based on the entered keywords "kitchen range" from search 404, for example. In some implementations, the topic is identified as an entity related to the content of the visit, e.g., the query, content of a webpage, or context information, using conventional or later developed techniques for identifying entities in text or images. The topic could instead have been "kitchen appliances" or "range applications" or other such system-generated topic based on particular searches entered, search activity, and visited webpages. Additional journeys may be provided in a list under the journeys 406. If the user selects the control 408 as an entry point to a journey, the window 410 may be provided.

In response to receiving a selection on control 408, for example, the system 202 may trigger a history cluster listing to be generated based on the prior search journey "kitchen ranges". The history cluster listing depicted is history cluster listing 100, but any history cluster listing content may be generated and populated depending on the prior searches, topic, and historical interaction the user may have had with the web browser 214.

The window 410 depicts a history page of browser 214. In some implementations, the same options and history cluster listing content may instead be provided in another webpage, window, control or toolbar, etc. In addition, journeys and prior searches may be depicted as menu items, as shown by menu 412. The user may select prior searches, such as search 404a, to be presented the previous search results from search 404. Other prior searches may also be depicted in the menu 412 if, for example, system 202 generated history cluster listings, and/or other records related to such searches.

In some implementations menu 412 may be a tabbed navigation menu in which elements 404a, 414, 408a, and 416 (and/or other items not shown here) are shown in separate tabs. In some implementations, such elements are shown with additional nested items that may be accessed and presented as part of history cluster listing 100.

The user may also view other journeys previously performed, as shown by control 408a. The user may also view a traditional browser history 220 by selecting control 414. In addition, the user may select control 416 to view content open in browser tabs of other devices that, for example, may be associated with the user account performing the searches shown in window 410.

FIG. 4B depicts another example history cluster listing 100A. The history cluster listing 100A may provide the user with a visual way to begin searching from a place that the user left the search task. For example, because the last steps of the user are depicted in the form of suggested searches, recent tabs and bookmarks, as well as traditional search history page data or browser history page data, the user may get a feel for where the search task ended and where the user can logically continue the search.

In this example, the web activity pertaining to the topic "kitchen ranges" is depicted as shown in history cluster listing 100, but additional information is also depicted. For example, the history cluster listing 100A also includes relevant content from tabs and/or bookmarks in section 418 that pertain to the journey associated with the topic. In particular, section 418 depicts a number of webpage visits represented as part of a recent tab group 420. Recent related bookmarks 422, 424, and 426 are also shown. Any number of tab groups and bookmarks may be represented in section 418 in response to system 202 determining that the content is related to a particular cluster represented in a search journey. In some implementations, the content provided in section 418 may also pertain to a recency condition to ensure that stale search content is not depicted.

The history cluster listing 100A may also include recent searches depicted in section 428. The recent searches are depicted as a conventional search history page listing, but may include additional functionality and nesting of search content based on being generated for display in the history cluster listing 100A, rather than generated for display in the search history page or browser history page. For example, duplicative content may be removed from the listings in section 428.

In some implementations, the content listed in section 428 may include website content in which the user had high engagement (e.g., content interactions, clicks, etc.) and/or high dwell time. For example, the system 202 may determine metadata that indicates engagement scores and/or dwell time scores associated with any number of previously accessed websites. The sites with the highest engagement scores may be selected for display in the section 428. In some implementations, the other sections of a history cluster listing may also include or exclude content based on the engagement scores of the associated accessed webpages. In some implementations, secondary items with lower engagement and/or dwell time scores may be nested under content with higher engagement and/or dwell time scores.

The history cluster listing 100A is depicted as a content-based structure in which content is used as the basis for displaying items in a particular section. In some implementations, the system 202 may instead use a time-based structure to visually list previously accessed content based on the time accessed. The same visual content may be depicted, but the order of display may be different if the access timestamp is used as the ordering basis for display.

Figure 4C:
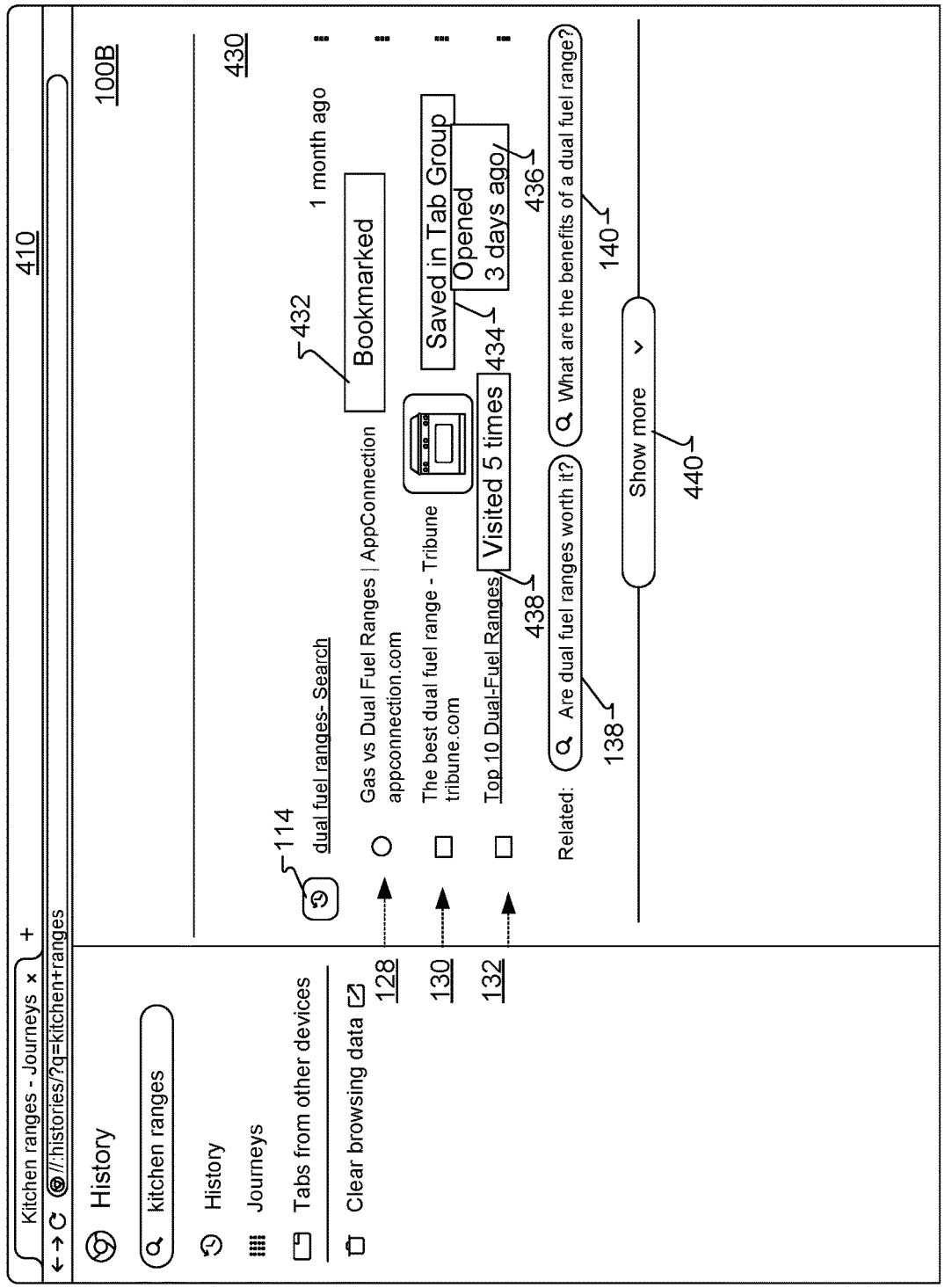

FIG. 4C depicts another example history cluster listing 100B. The history cluster listing 100B may provide the user with a visual way to begin searching from a place that the user left the search task. For example, because the last steps of the user are depicted in the form of suggested searches, recent tabs and bookmarks, as well as traditional search history page data or browser history page data, the user may ascertain where a prior search task ended and where the user can logically continue the search.

In this example, the web activity pertaining to the topic "kitchen ranges" is depicted as shown in history cluster listing 100B, but additional information is also depicted. In particular, a section 430 includes the webpage visit 114 representing, in this example, a top visit (e.g. top visit 124 for history cluster 108B). The section 430 also includes visits 128, 130, and 132, which represent visits that also have some similarity to a particular topic (e.g., topic 120 of FIG. 1). The visits 128, 130, and 132 may represent nested related visits to the visit 114. For example, if the visit 114 is the top visit for cluster 108B, then visits 128, 130, and 132 may be nested webpage visits that pertain to a search query source event. Thus, the visits 128, 130, and 132 may be generated by computing system 110 as visit listings that are generated for display in the history cluster listing 100B based on a determined score of each associated webpage visit.

In addition, the history cluster listing 100B includes indicators representative of analyzed metadata. Analyzed metadata may include metadata 224 collected by browser 214 and analyzed for purposes of generating UI content for a history cluster listing. In this example, the metadata was used to generate one or more metadata badges, such as badge 432, badge 434, badge 436, and badge 438. In some implementations, the user may choose to view or hide badges in a history cluster listing. In some implementations, the user may use a badge to modify the status of a particular visit. For example, if the visit is indicated as a bookmarked webpage, the user may select the badge to configure the visit as a favorite instead of a bookmark, undo a bookmark indication, and/or perform another classification modification to the visit.

The badge 432 indicates that the visit 128 is a bookmarked webpage. The badge 432 may be generated by UI generator 226 in response to determining that visit 128 is bookmarked in the browser 214. In some implementations, the badge 432 may indicate a time of bookmark. In some implementations, the badge 432 may indicate a rank of the bookmark with respect to other bookmarks.

The badge 434 indicates that visit 130 is saved in a tab group. The badge 432 may be generated by UI generator 226 in response to determining that visit 130 is part of a tab group associated with the browser 214. In some implementations, visit listings may include more than one badge. As shown, the visit 130 includes a second badge 436 indicating that visit 130 was opened again three days ago. In some implementations, the badge 436 applies to the visit 130. In some implementations, the badge 436 may apply to another badge, such as bade 434. In such an example, the badge 436 of opening three days ago may apply to the tab group indicated by badge 434.

The badge 438 indicates that the visit 132 was visited by the user five times. The badge 438 may be generated by UI generator 226 in response to determining that visit 132 was visited five times before in the browser 214. Badges may be updated as a user visits webpages. The history cluster listing 100B may also include related queries, such as related searches 138 and 140, as described in detail above. The history cluster listing 100B may additionally include a show more control 440 to show additional related visits.

In some implementations, the metadata may be captured, but may not be illustrated in a particular history cluster listing. In such an example, the user may configure the history cluster listings to display (or not display) metadata-related information (e.g., badges generated based on metadata associated with web activity, timestamps, etc.). The option to display (or not display) metadata-related information may allow the user to view history cluster listings in a less data-crowded form to facilitate ease of review of the history cluster listing. In some implementations, the option to display (or not display) metadata-related information may allow the user to make informed selections based on the presented metadata to avoid reviewing content or links that are of less interest to the user's next steps.

Figure 5A:
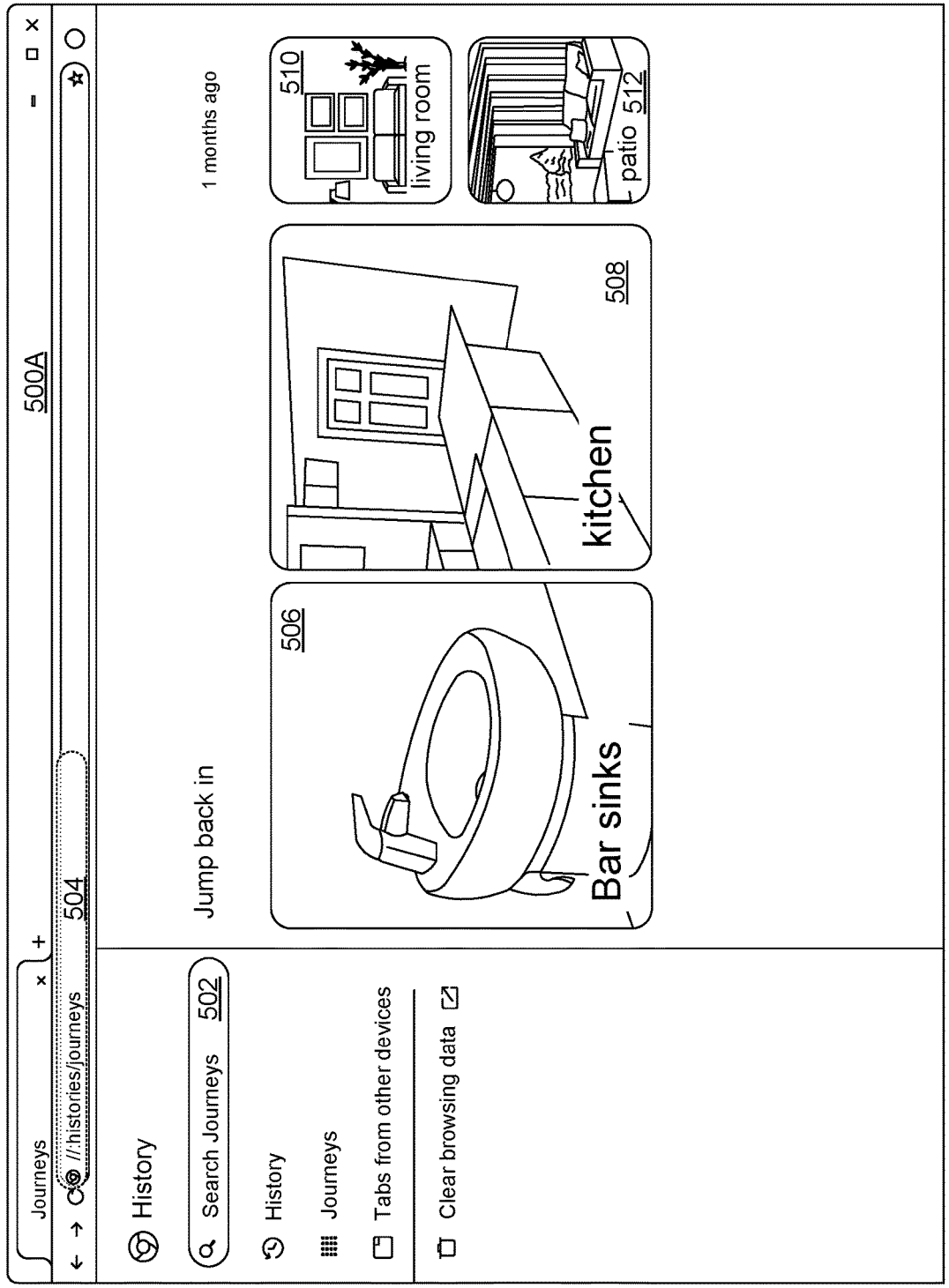
Figure 5B:
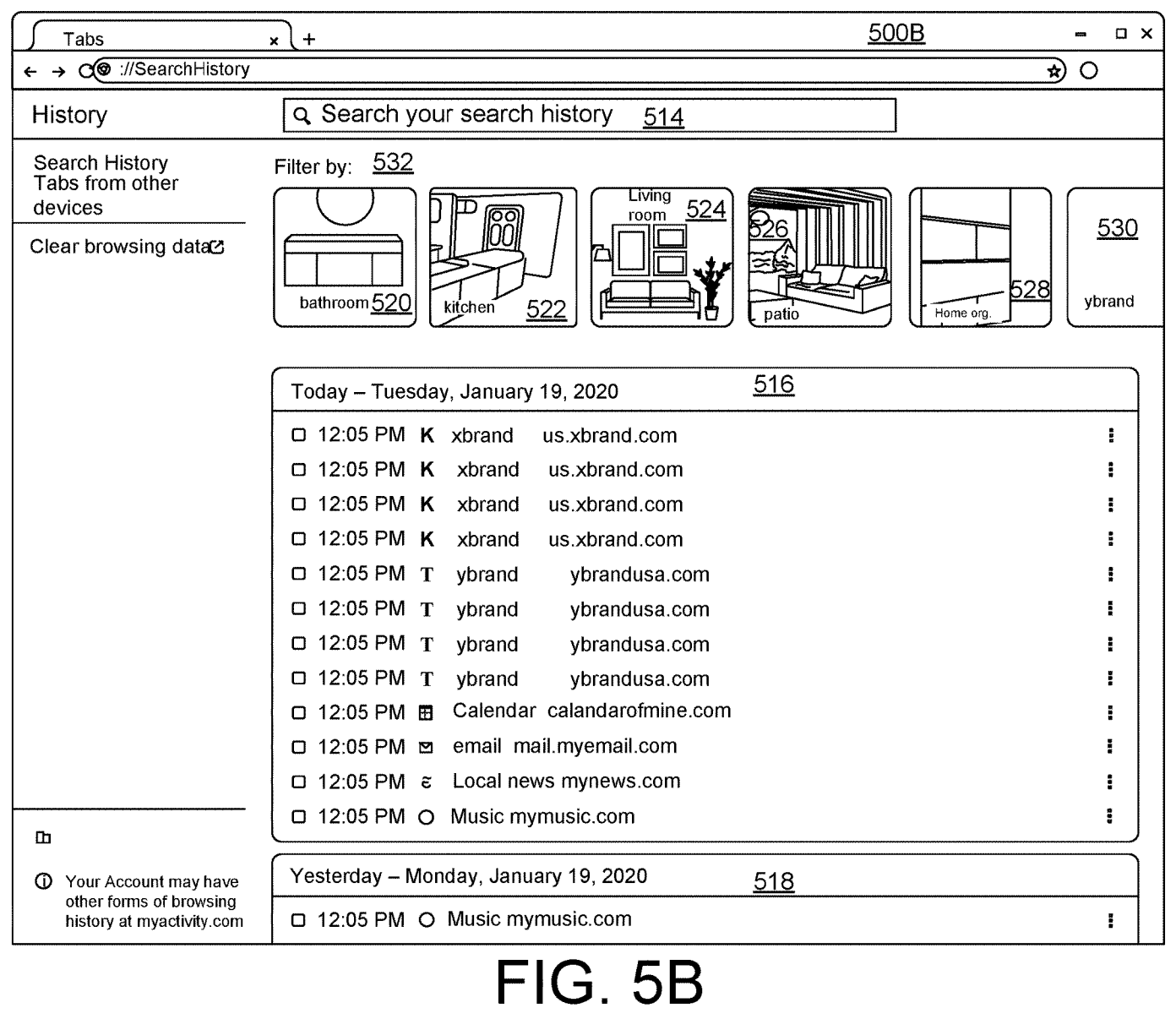
Figure 5C:
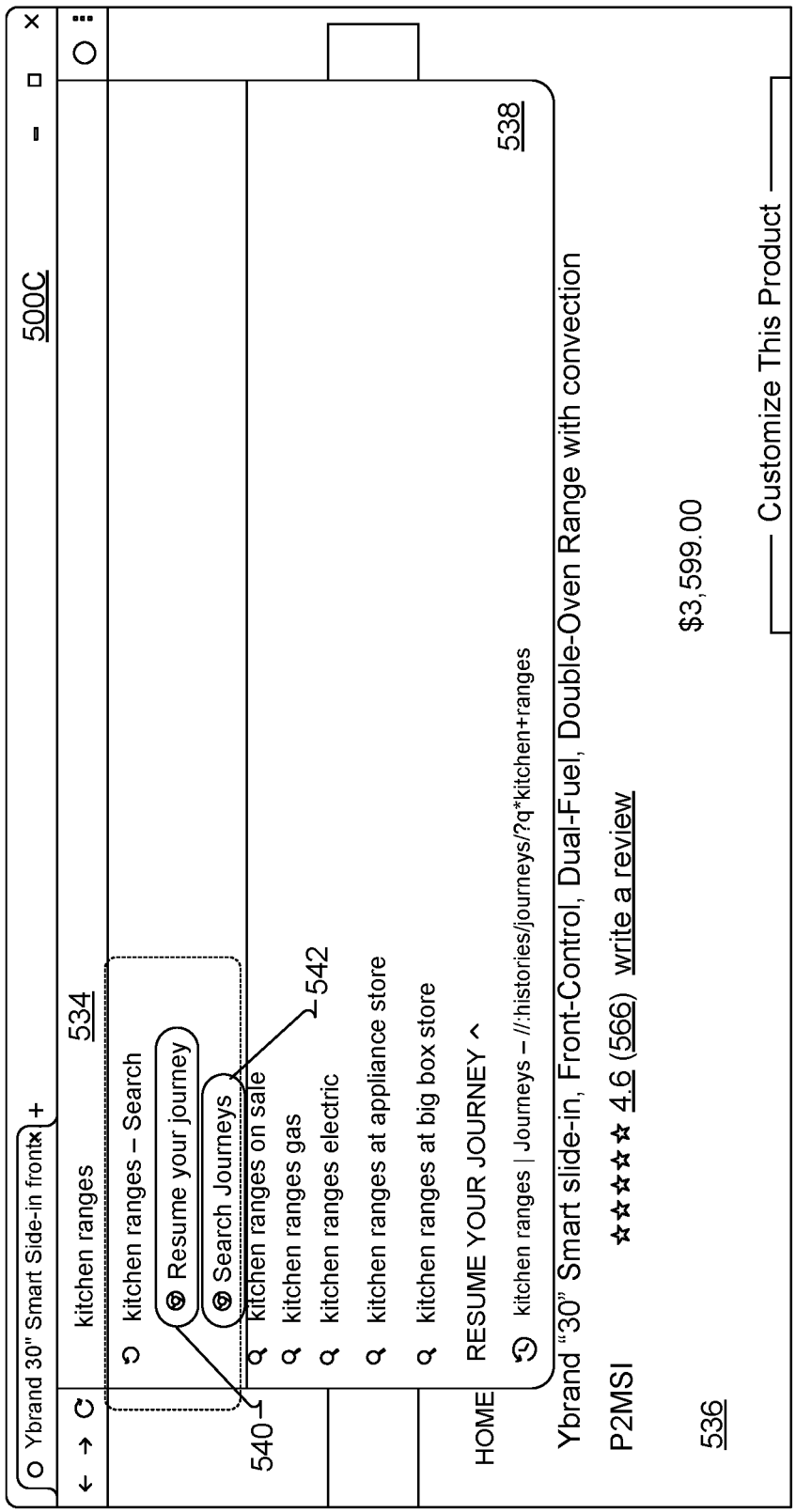

FIGS. 5A-5C are example user interfaces illustrating examples of accessing and interacting with a history cluster listing, in accordance with implementations described herein. The history cluster listing 100 may be created based on history clusters 222 generated according to metadata 224 and browser history 220. In general, a user may access a history cluster listing (e.g., history cluster listing 100) from a number of locations within the web browser 214. For example, the user may access a history cluster listing using direct URL navigation, suggested search controls, a query entered into a query control, menu items and/or controls presented on a history page, etc.

FIG. 5A is a user interface of a history page 500A in which a user has selected to search journeys using control 502. In this example, the user may be presented with any number of previous search journeys that the user may have previously performed. The presented search journeys may be depicted based on a determined time period. The time period may be system-selected or user selected. For example, the computing system 202 may determine to generate and display the last month of search journeys using an access timestamp associated with webpages accessed and accounted for in one or more of the search journeys.

In an example, the ML models 236 may generate history clusters based on the search journeys performed in the last month. The clusters may be ranked and/or indexed. One or more of the ranked and/or indexed clusters may be obtained responsive to which search journeys are determined to be displayed. The obtained clusters may be used to generate history cluster listings pertaining to particular search journeys. In some implementations, a history cluster listing is generated responsive to receiving user selection of a particular search journey.

As shown in FIG. 5A, the user entered a search journeys page associated with the browser and/or search history page using a direct navigation via URL into the browser URL toolbar 504. The journeys page depicts search journeys performed by the user in the last month. The journeys include a bar sinks journey 506, a kitchen journey 508, a living room journey 510, and a patio journey 512. In some implementations, more or fewer journeys may be depicted in example page 500A. In addition, any time period of search journeys may be used.

FIG. 5B is a user interface illustrating an example of filtering browser history 220 of a browser and/or search history page 500B. The page 500B includes a control 514 to search events and content listed in the browser history 220. In addition, the browser history 220 may be provided with the control 514 and/or other controls, as shown by chronologically listed webpage accesses 516 and 518.

In some implementations, the system 202 may also utilize the generated history clusters 222 in order to present content on the browser and/or search history page 500B. Such clusters may be used to filter content in the chronologically listed webpage accesses 516 and 518. For example, the system 202 may have generated clusters 222 to include a bathroom topic (or subtopic) 520, a kitchen topic (or subtopic) 522, a living room topic (or subtopic) 524, a patio topic (or subtopic) 526, a home topic (or subtopic) 528, and a ybrand topic (or subtopic) 530. The search history and/or browser history is thus provided based on relevance of a webpage to a particular topic, not merely based on the chronology shown at 516, 518.

The topics (or subtopics) may be provided as a selectable control (e.g., controls in section 532) within page 500B to filter the browser history 220 according to topic or subtopic. For example, the user may select topic ybrand 530 to filter the browser history 220 to show particular webpages that pertain to ybrand. Such webpages may include data, topics, subtopics, metadata, and/or related content with respect to the ybrand keyword. As shown, section 532 includes visual image and textual content representing webpages accessed with respect to the topics listed. Other variations of visual image and textual content may be depicted to enable the user to interpret the topic of the particular filter.

FIG. 5C is a user interface 500C illustrating a user accessing browser history 220 in a browser toolbar 534. In this example, a user has entered a search query for "kitchen ranges" into toolbar 534 of browser 214. The browser toolbar 534 can also be referred to as a search box, an omnibox, or a query input area. The user may have been viewing a searched content 536, shown behind dropdown 538 and may have decided to search for different content. Thus, the user entered a search query (including an incomplete/partial query) at toolbar 534 and in response, the browser 214 receives the search query (or partial query) and provides a number of search terms that may match portions of the search query via autocomplete mechanisms (suggested completions for the query), for example. In the number of proposed search queries, the browser 214 may also provide a search journey control 540 to allow the user to return to resume the search journey that was previously conducted in the browser. The user may select the control 540 and may be provided a history cluster listing related to the search journey that includes the query terms "search" and/or "ranges," as shown by example history cluster listing 100 in FIGS. 1 and 4A. In some implementations, the browser 214 may also provide an option to search all search journeys, as shown by control 542. In some implementations, the browser 214 may additionally provide autocomplete entries based on the context (e.g., metadata) associated with a previous search journey matching one or more keywords entered into the browser toolbar 534.

FIG. 5D is a user interface 500D illustrating an example of a list view of a browser history 220 of a browser and/or search history page. Here, the user has selected to view the search history (or browser history) as a reverse chronological list of webpage visits by selecting a list control 544. The user interface 500D includes the control 514 to search events and content listed in the browser history 220. In addition, the browser history 220 may be provided with the control 514 and/or other controls, as shown by reverse chronologically listed webpage access lists 516 and 518. In some implementations, the user may select an option to view web visits from other tabs from other devices saved into the browser 214, for example. The web visits from the other tabs may then be included in the list view according to the visit time and/or date. In some implementations, the user may instead wish to view the search history or browser history in a journey view. To do so, the user may select a journeys control 546 to switch to viewing the history data (e.g., search history data, browser history data) from the list view to a journeys view to be provided with user interface 500E.

As shown in FIG. 5D, the list control 544 and journey control 546 are depicted as selectable controls that may be used to navigate to the particular list view or journey view. In some implementations, the list view and journey view may be provided in a tab view to allow a user to switch between a list view tab and a journey view tab within the browser and/or search history.

Figure 5E:
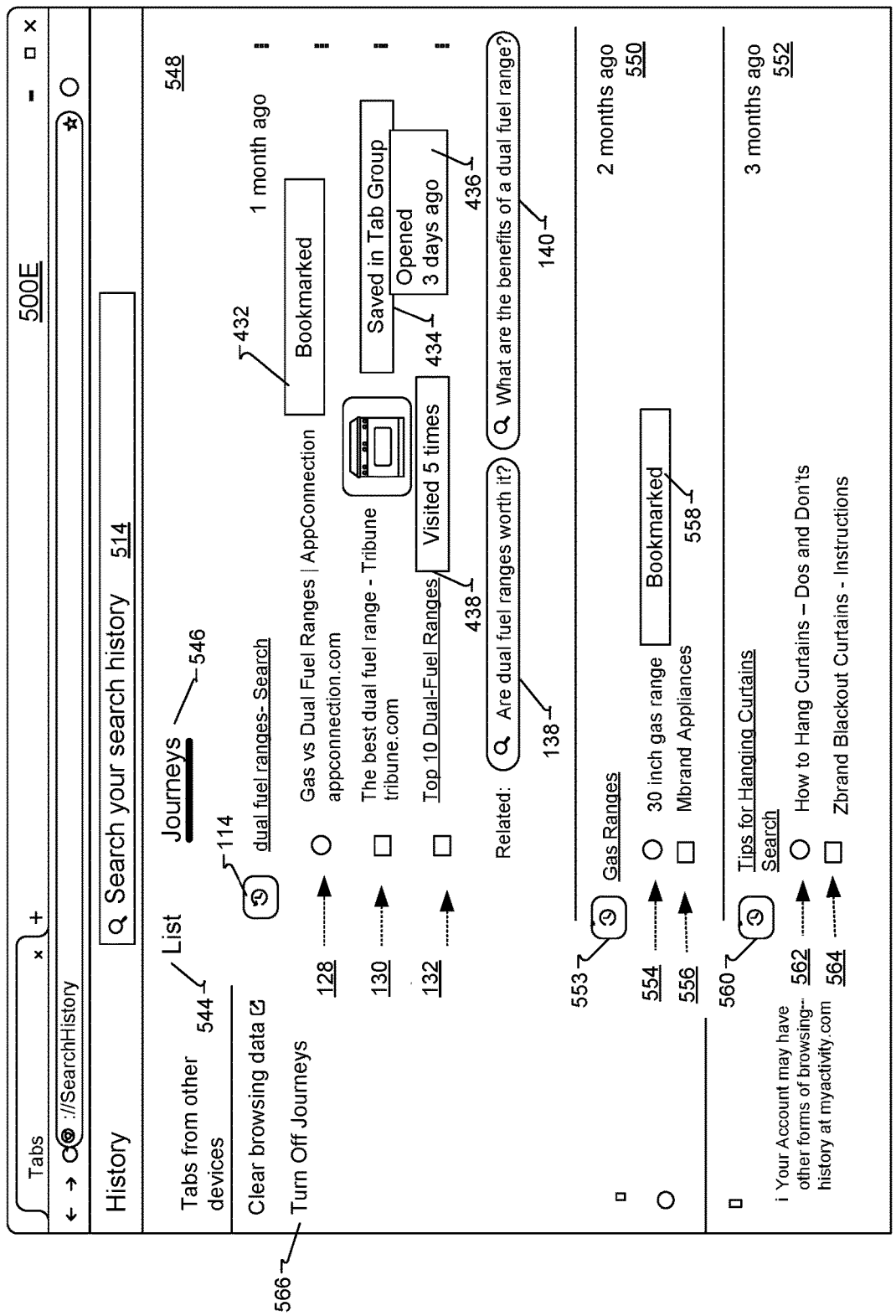

FIG. 5E is a user interface 500E illustrating an example of a journeys view of a browser history 220 and/or search history page 500E. The journeys view may represent a history cluster listing, for example, with any number of sections. The sections shown in FIG. 5E include a first section 548, a second section 550, and a third section 552. The section 548 is similar to section 430 of FIG. 4C. In particular, web activity pertaining to the topic "kitchen ranges" is depicted to include at least one web page visit 114 representing, in this example, a top visit (e.g. top visit 124 for history cluster 108B). The section 548 also includes visits 128, 130, and 132, which represent visits that also have some similarity to a particular topic (e.g., topic 120 of FIG. 1). The visits 128, 130, and 132 may represent nested related visits to the visit 114. Badges 432, 434, and 436 are also shown for particular web page visits, as described in detail in FIG. 4C. Section 548 also includes related searches 138 and 140 (queries). Any number of related queries may be shown. In some implementations, the related search queries may change as journeys are updated with new information triggered by new user web activity. Additional content pertaining to visit 114 may also be shown in full in interface 500E or provided in response to a user requesting to view additional data (e.g., via show more controls, update journey controls, etc.).

Section 550 includes a top visit 553 pertaining to the web activity of "kitchen ranges" similar to section 548. In this example, the subtopic may pertain to "gas ranges." The subtopic may be generated as a separate history cluster from the initial history cluster associated with section 548, for example. The top visit 553 may include ranked related visits 554 and 556, any of which may include badges, as shown by badge 558, for example, indicating that visit 554 is bookmarked. Although not depicted, related searches, additional controls, and/or additional visits may be listed or made accessible within section 550.

Section 552 includes a top visit 560 pertaining to the web activity of "curtains." The section 552 may have been generated based on a search journey associated with user inputted searches or web activity about curtain-related topics. In this example, a topic or subtopic about the curtains may pertain to "tips for hanging curtains." The topic or subtopic may be generated as a separate history cluster from the initial history cluster associated with sections 548 and 550, for example. The top visit 560 may include ranked related visits 562 and 564, any of which may include badges, images, links, indicators, etc. Although not depicted, related searches, additional controls, and/or additional visits may be listed or made accessible within section 550.

In some implementations, the browser 214 may provide the user an option to turn off journey generation, as indicated by control 566. Turning off journey generation results in the web browser 214 halting the clustering of visits according to topics/subtopics. If the journey generation is configured in an off mode, the browser 214 may not generate additional search journeys. Thus, to review browser and/or search history, the user may view the list view to access recent and historical browser and/or search history data/activity.

FIGS. 6A-6C are example user interfaces illustrating an example of modifying a browser history by modifying a history cluster listing, in accordance with implementations described herein. For example, FIG. 6A illustrates a history cluster listing 600 with a number of clusters (e.g., cluster 602 and cluster 604). Cluster 602 includes visit listings 606, 608, and 610 that represent any number of webpages visits carried out by a user with respect to a particular search journey and the "kitchen ranges" topic. Related search queries 612 may be provided which indicates additional ways to continue the search journey related to that cluster. In the example of FIG. 6A, history cluster 602 is ranked higher than and displayed ahead of history cluster 604 based on a recency of the access timestamps associated with the pages and/or based on the similarity to a particular topic or sub-topic.

Other clusters may be presented in the example history cluster listing 600. The clusters generally represent a search journey or a portion of a search journey previously performed by a user.

The user may access any and all cluster and sub-cluster webpages to view additional content associated with such webpages. For example, a cluster 602 may represent a number of webpages in which the user may select upon to be navigated to the webpage or to additional webpages associated with the selected webpage. In some implementations, the user may select a show more control 622 to view additional content associated with the cluster 602.

The user may also select upon content or webpages associated with a sub-cluster. For example, the user may select a sub-cluster 608 to view additional content associated with the sub-cluster 608. In some implementations, the user may access additional menus associated with clusters or sub-clusters. For example, the user may access a menu 624 associated with cluster 602. In particular, the menu 624 may be opened with respect to visit listing 608. The menu 624 depicts an option to open the visit listing 608 (and/or related webpages or information) in a new browser tab.

In addition, the menu 624 depicts and an option to delete the visit listing 608 from the cluster 602, which can also trigger deletion of the underlying webpage visits from the search history. If the user selects to delete the visit listing 608 from the cluster 602, the browser 214 may delete the listing 608 and associated webpages from the cluster that was used to generate history cluster listing 600 (e.g., cluster 602). This targeted approach to deletion can remove sensitive content from a device in an unobtrusive manner, without the typical clearing of the entire search and/or browser history.

FIG. 6B illustrates the history cluster listing 600 with another example menu 626. The menu 626 includes an option to open all webpages pertaining to visit listing 608 as a tab group. Such an option may open a new browser tab group and generate associated tabs for the webpages in the visit listing 608. The browser tab group may include an indicator (e.g., text, color, etc.) that the particular webpages belong to the newly generated browser tab group.

The menu 626 also includes an option to delete all from the history. The option is selected with respect to visit listing 608 and thus, if selected, the browser 214 deletes the visit listing 608 and related webpages from both the cluster that generated history cluster listing 600 as well as the browser history 220 of the web browser.

FIG. 6C illustrates a UI 628 opened in association with a visit listing of the history cluster listing 600 and cluster 602, in particular. The UI 628 provides an option for the user to delete webpages in a bulk deletion based on which visit listings (and/or webpages) are selected in UI 628. In response to selecting a delete in bulk control, the browser 214 may retrieve data including at least a list visit listings and associated webpages of the cluster 602. The retrieved data may be provided in the UI 628 and as such, the user may select any number of items in UI 628 to delete the items from the browser history 220, for example. This may provide an advantage of enabling the user to remove entire search concepts/journeys from the search history without sifting through chronological records that are not indicated according to topic. Thus, the history cluster listing provides a novel and efficient way to manage the search history.

In some implementations, the UI generator 226 may receive a request to remove a webpage associated with a cluster rendered in the history cluster listing 600. The request may be received in UI 628. The request may trigger deletion of a stored record of access to the webpages from the browser history 220. In some implementations, the deletion may be to remove the content from the search journey so that the content does not show up on a history cluster listing in future web sessions. For example, if the user has ruled out purchasing a particular brand of range, the user may not wish to view ranges of that brand in future history cluster listings and thus, may choose to remove the view and/or interaction with webpages associated with that brand from the search history. This may ensure that user avoids being presented such content because clusters are generated based on search history events (e.g., webpage accesses/visits). If the visits pertaining to the brand of range are removed, such visits will not be part of future clusters or sub-clusters used for history cluster listings.

Figure 7:
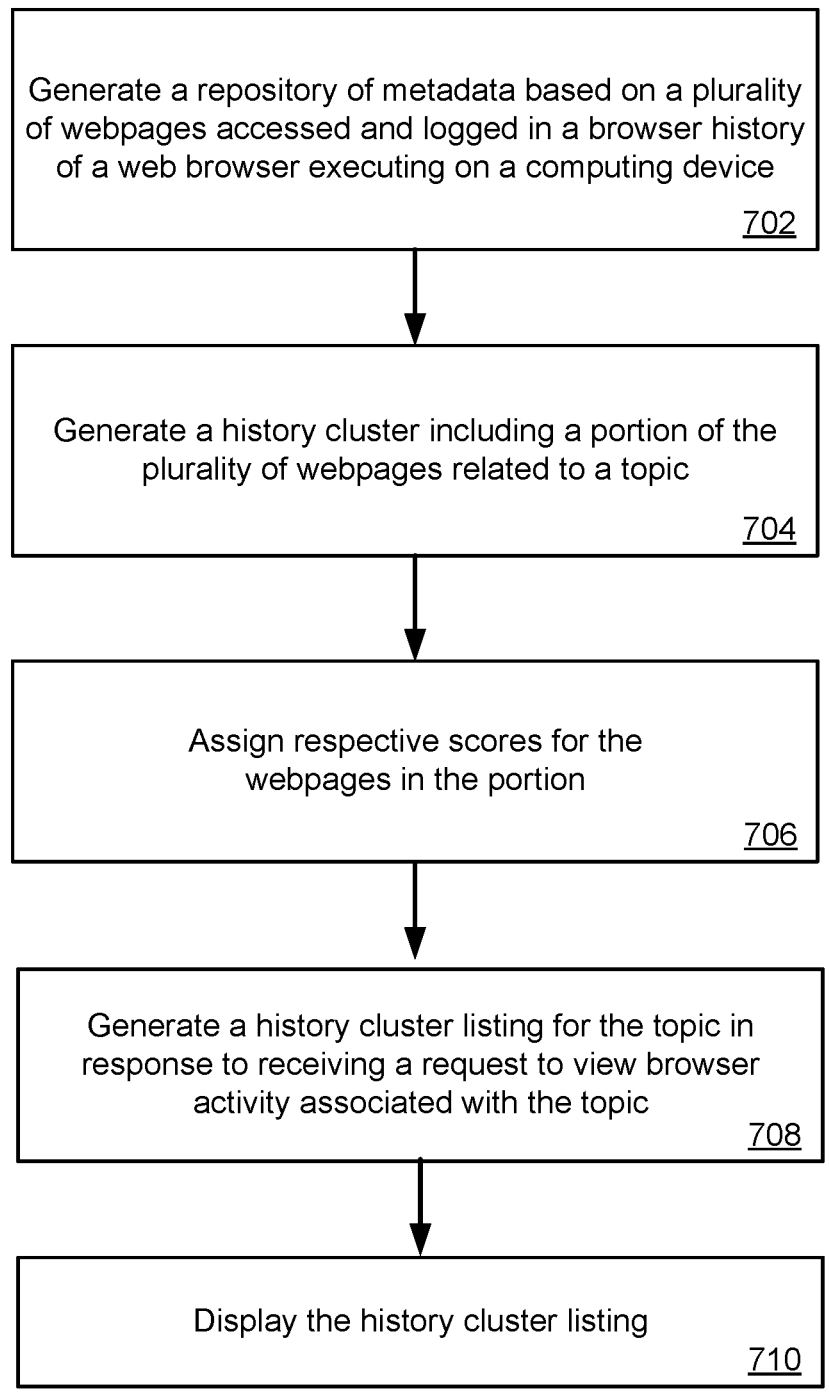
FIG. 7 is a flow diagram for an example process of generating user interface content pertaining to browser search activity, in accordance with implementations described herein.

FIG. 7 is a flow diagram for an example process 700 of generating user interface content pertaining to browser search activity, in accordance with implementations described herein. In particular, the process 700 may be used to generate and display a number of search history UIs that represent browser activity and/or search activity performed by a user. The search history UIs are populated with search history data, browser history data, and/or populated with data based on associated metadata. The search activity and/or browser activity may include one or more searches and/or interactions performed by a user accessing the web browser 214, for example. With user permission, the process 700 may generate history clusters (e.g., representing a search journey including several search and/or browser activities) using the activity stored in a browser history 220 and/or accessed webpages 221 of the web browser 214, for example. Particular input and/or requests from a user of a web browser may trigger display of data associated with the history clusters 222.

In general, process 700 utilizes the systems and algorithms described herein to generate and render history cluster listings indicative of historical search data performed in a web browser. The process 700 may utilize one or more computing systems with at least one processing device and memory storing instructions that when executed cause the processing device(s) to perform the plurality of operations and computer implemented steps described in the claims.

At block 702, the process 700 includes generating a repository of metadata based on a plurality of webpages accessed and saved in a browser history of a web browser executing on a computing device. For example, the metadata 224 may be generated using browser history 220, accessed webpages 221, and/or metadata generated from and/or retrieved from such browser history 220 and accessed webpages 221. The browser history 220 may be saved by system 202 when a user accesses the web browser and/or interacts with web content during the course of conducting searches and/or reviewing the web content.

The metadata 224 may include, for respective webpages (i.e., for each webpage visit/access), a source event 245 (e.g., an event indicating the source of a webpage opened in a web browser), an access timestamp 238, and at least one topic 242. In some implementations, the metadata 224 may additionally include webpage identifiers defined for webpages in a history cluster 222. The webpage identifiers may indicate whether a respective webpage is part of a tab group, a bookmark, or a search results page accessed by the computing device. In some implementations, the metadata further includes, for one or more of the webpages, determined webpage entities, a plurality of related searches, and/or a dwell time on the webpage.

In some implementations, generating the repository of metadata further includes de-duping the plurality of webpages accessed and saved in the browser history 220. The de-duping may include determining duplicative webpage accesses in the plurality of webpages accessed, selecting, for the duplicative webpage accesses, a webpage with a latest access timestamp with respect to access timestamps associated with the determined duplicative webpage accesses, and generating, for the webpage with the latest access timestamp, the metadata for storage in the repository. This may function to ensure recent webpages are retained while less recent webpages are discarded or not utilized for display in a history cluster listing, for example.

At block 704, the process 700 includes generating, based on the metadata, a history cluster representing a portion of the plurality of webpages related to a topic. For example, the history cluster 108B may include a subset of webpages (e.g., visit listings representative of visit 128, visit 130, and visit 132) that a user accessed that were related to the topic "kitchen ranges" associated with the history cluster listing 100. The history cluster 108B may also include webpage visits (e.g., visit listings) based on the source events and the access timestamps of the particular webpages in the portion. For example, the history cluster 108B may include additional content which may be related searches that the user may have performed and/or webpages that the user may have visited, any of which may pertain to a source event representing previous search results and/or research performed with respect to the cluster 108B and/or the topic 120. In some implementations, the access timestamp 134 may pertain to the cluster 108B, but each visit 128-130 may be associated with individual access timestamps that may be used to rank or otherwise order the visits in a particular cluster, or in the history cluster listing 100 as a whole.

In some implementations, the history cluster associated with visit 116, for example, has a title and the UI generator 226 generated a link to display the title as a suggested link, as shown by title "30 inches Gas Ranges." Selection of the link issues the request to view the data associated with the history cluster 108C. In some implementations, the suggested link is displayed as a search suggestion in a search engine (e.g., such as controls 152, 154, and 156 leading to related links to cluster 116 and/or topic 120). In some implementations, the suggested link may be displayed as an option in the search history, as shown in FIG. 4B (e.g., links pertaining to related searches 138 and 140 and/or links associated with webpage visit 114) and/or FIG. 5B (e.g., links 520-530).

In some implementations, portions of a history cluster 222 may include or refer to a snippet for at least one webpage of the plurality of webpages in the portion. A snippet is a short (e.g., one to two lines of text) description or identification of a webpage and/or its content. A snippet for a webpage can include a shortened URL, e.g., a domain, or a domain and shortened path, etc. for the webpage. A snippet for a webpage can include concise text extracted from the webpage. A snippet can include a title identifying the content of the webpage. A snippet can include two or more of a shortened URL, concise text, or a title. The cluster may include one or more related action controls. Related actions are actions that can be performed on a history cluster or portions of a history cluster. Related actions can include resuming a search journey by reissuing a query associated with the history cluster. Related actions can include deleting deleing the saved search history and/or browser history of the history cluster. Related actions can include a suggested related search. A suggested related search can be a query not submitted by the user, but that may expand the journey represented by the history cluster in a related direction. Related actions can include bookmarking a location (webpage) in the cluster. Related actions can include opening a webpage in a new tab. Related action controls may be provided by, or represented with, selectable UI elements. In other words, control buttons for performing actions related to the cluster may be provided. For example, the cluster 108B that includes visit 130 depicts a snippet 147 about the best dual fuel range and an image portion snippet 149 along with a resume search journey control 143 to enable the user to continue to the webpage and continue searching. In general, the history cluster(s) and the sub-clusters may be generated as output of an ML model (e.g., ML models 236) that may be executing on the computing system 202 and using the metadata 224 as input. ML models 236 are described in detail with respect to FIG. 2.

At block 706, the process 700 includes assigning respective scores 244 for the webpages in the portion. For example, the score/rank generator 232 may assign scores to a portion of webpages in cluster 108B. The respective scores may be based at least in part on the access timestamps 134 and determined engagement scores associated with the respective webpages in the portion of webpages for the history cluster 108B. In some implementations, the score 244 for a particular webpage visit may be calculated based on the metadata 224 including, for example, a determined engagement (e.g., interaction) with the webpage during the visit (e.g., an engagement score 240 based on engagement metrics). In some implementations, the engagement scores include respective engagement metrics for the webpages in the portion. The respective engagement metrics may be used for selecting a prominence level with which to display, in the history cluster listing 100, snippets for at least one webpage of the plurality of webpages in the portion.

Engagement metrics may include, but are not limited to a representation of how long a webpage tab was in the foreground, a number of times the webpage was visited (e.g., return page visits), whether the webpage is a bookmark, whether the webpage belongs to a tab group, a number of times the bookmark or tab group was accessed, visited, interacted with, advertisements selected, search results interacted with, page views, entities selected, scroll depth, exit rate, bounce rate, abandonment rate, comments provided, reviews provided, click throughs, etc.

At block 708, the process 700 includes, in response to a request to view search activity associated with the topic, generating a history cluster listing 100 for the topic (and/or subtopic) that includes one or more history clusters associated with the topic. The history cluster listing may be organized according to the history clusters and within a history cluster, according to respective scores of the webpages in the history cluster. In some implementations, the history cluster listing may include visit listings representing the webpages in the portion if the respective webpages are determined to have a score that meets a threshold score.

An example threshold score may indicate a level of similarity between a topic or subtopic and a particular webpage in the browser history 220. For example, if a webpage is determined to have at least fifty percent or higher similarity with a particular topic and/or subtopic, the webpage may have a score that meets the threshold score. In some implementations, the threshold score may pertain to the topic and a score of about eighty percent similarity or higher between a topic and a webpage may be indicated as the threshold score in which to trigger selection of the webpage for inclusion in a cluster and/or resulting history cluster listing. Other threshold scores and combinations of similarity determinations between topic, subtopic, and webpage are possible. For example, additional scores, thresholds, and/or rankings may be utilized based at least in part on metadata corresponding to activities (e.g., engagement activities/metrics, click events, search events, tab/bookmark events, etc.) performed in the web browser and/or particular search history data (e.g., access timestamps, topics, subtopics) and the like.

At block 710, the process 700 includes displaying the history cluster listing. For example, the renderer 246 may be triggered by system 202 to display the history cluster listing 100 in response to receiving an indication to view a particular search journey, webpage, or topic or related history cluster listing 100. In some implementations, the history cluster listing may be rendered upon completion of generation of the history cluster listing.

In some implementations, a history cluster listing may include topically organized and source events organized, and/or access timestamp organized search history information, search activity information, and related search result information depicted according to determined scores and/or rankings. For example, the history cluster listing may include visit listings corresponding to at least one of the webpages in the portion. For example, history cluster listing 100 includes a number of search results (e.g., visit listings and/or webpages of a cluster such as the visit listings pertaining visit 128) for particular webpages that may be accessed using control 126. In some implementations, the plurality of visit listings may be presented within the browser history 220 of the web browser 214. In some implementations, the history cluster listing also includes an action control configured to resume a previous search associated with the plurality of visit listings. For example, the cluster 108B may include an image portion snippet 149 along with a resume search journey control 143 to enable the user to continue to the webpage and continue searching.

Figure 8:
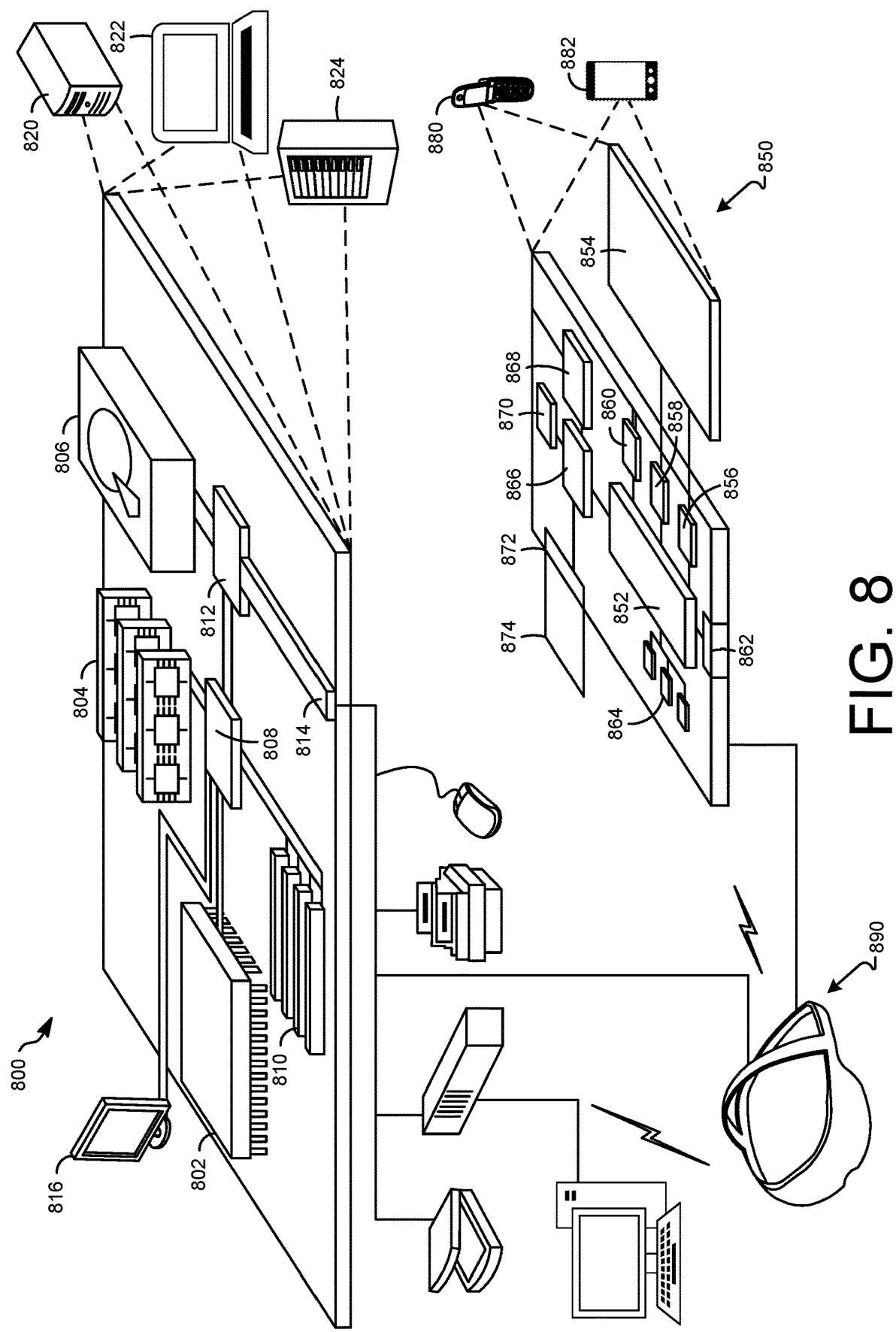
FIG. 8 shows an example of a computer device and a mobile computer device that can be used to implement the techniques described herein.

FIG. 8 shows an example of a computer device 800 and a mobile computer device 850, which may be used with the techniques described here. Computing device 800 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be an example only, and are not meant to limit implementations of the implementations described and/or claimed in this document.

Computing device 800 includes a processor 802, memory 804, a storage device 806, a high-speed interface 808 connecting to memory 804 and high-speed expansion ports 810, and a low speed interface 812 connecting to eternal device port 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In general, the computer-readable medium may be a non-transitory computer-readable medium.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 804, the storage device 806, or memory on processor 802.

The high speed interface 808 manages bandwidth-intensive operations for the computing device 800, while the low speed interface 812 manages lower bandwidth-intensive operations. Such allocation of functions is an example only. In one implementation, the high-speed interface 808 is coupled to memory 804, display 816 (e.g., through a graphics processor or accelerator), and to high-speed expansion ports 810, which may accept various expansion cards (not shown). In the implementation, low-speed interface 812 is coupled to storage device 806 and external device port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality or headset (VR headset/AR headset/HMD device 890). For example, one or more sensors included on computing device 850 or other computing device depicted in FIG. 8, can provide input to AR/VR headset 890 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 850 can use the sensors to determine an absolute position and/or a detected rotation of the computing device in the AR/VR space that can then be used as input to the AR/VR space. For example, computing device 850 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some implementations, one or more input devices included on, or connect to, the computing device 850 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the AR/VR space can cause a particular action to occur in the AR/VR space.

In some implementations, one or more output devices included on the computing device 850 can provide output and/or feedback to a user of the AR/VR headset 890 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, computing device 850 can be placed within AR/VR headset 890 to create an AR/VR system. AR/VR headset 890 can include one or more positioning elements that allow for the placement of computing device 850, such as smart phone 882, in the appropriate position within AR/VR headset 890. In such implementations, the display of smart phone 882 can render stereoscopic images representing the AR/VR space or virtual environment.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the AR/VR space. As just one example, computing device can be a laser pointer. In such an example, computing device 850 appears as a virtual laser pointer in the computer-generated, 3D environment. As the user manipulates computing device 850, the user in the AR/VR space sees movement of the laser pointer. The user receives feedback from interactions with the computing device 850 in the AR/VR environment on the computing device 850 or on the AR/VR headset 890.

In some implementations, a computing device 850 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space In the following, further examples of the system and method according to the present disclosure are described. In some aspects, the techniques described herein relate to a system including: a computing device executing a web browser; a user interface generator of the web browser, the user interface generator configured to generate a search history user interface based on a history cluster related to a topic, in response to a request to view search activity associated with the topic, the history cluster including a plurality of webpages accessed and saved in a search history of the web browser, the search history user interface including: a history cluster listing depicted in the search history user interface and populated with data from the history cluster related to the topic, wherein the history cluster listing includes a plurality of visit listings corresponding to at least a portion of the plurality of webpages included in the history cluster, and an action control configured to resume a previous search associated with the history cluster; and a renderer configured to cause display of the search history user interface.

In some aspects, the techniques described herein relate to a system, wherein the user interface generator is further configured to: receive at least a partial query in a query input area; determine that the partial query relates to the topic; and in response to determining that the partial query relates to the topic, providing a journey control configured to provide the request to view the search activity associated with the topic.

In some aspects, the techniques described herein relate to a system, wherein the journey control is provided with suggested completions for the partial query.

In some aspects, the techniques described herein relate to a system, wherein the plurality of visit listings includes an indication that the portion of the plurality of webpages belongs to a tab group or a bookmark of the web browser.

In some aspects, the techniques described herein relate to a system, wherein the search history user interface further includes a suggested related search.

In some aspects, the techniques described herein relate to a system, wherein the history cluster is generated based on metadata associated with webpages in the portion, the metadata including a source event, an access timestamp, an engagement score, or subtopics associated with the topic.

In some aspects, the techniques described herein relate to a system, wherein the engagement score includes respective engagement metrics for the webpages in the portion, the respective engagement metrics used for selecting a prominence level with which to display, in the history cluster listing, snippets for at least one webpage in the portion.

In some aspects, the techniques described herein relate to a system, wherein the user interface generator is further configured to receive a request to remove a webpage rendered in a visit listing of the plurality of visit listings and cause, based on the request, deletion of a stored record of access to the webpage from the search history.

In some aspects, the techniques described herein relate to a method including: receiving a request to view search activity associated with a topic; in response to the request, generating a search history user interface based on a history cluster related to the topic, the history cluster including a plurality of webpages accessed and saved in a search history of a web browser, the search history user interface including: a history cluster listing depicted in the search history user interface and populated with data from the history cluster related to the topic, wherein the history cluster listing includes a plurality of visit listings corresponding to at least a portion of the plurality of webpages included in the history cluster, and an action control configured to resume a previous search associated with the history cluster; and causing display of the search history user interface.

In some aspects, the techniques described herein relate to a method, further including: receiving at least a partial query in a query input area; determining that the partial query relates to the topic; and in response to determining that the partial query relates to the topic, providing a journey control configured to provide the request to view the search activity associated with the topic.

In some aspects, the techniques described herein relate to a method, wherein the journey control is provided with suggested completions for the partial query.

In some aspects, the techniques described herein relate to a method, wherein the plurality of visit listings includes an indication that the portion of the plurality of webpages belongs to a tab group or a bookmark of the web browser.

In some aspects, the techniques described herein relate to a method, wherein the search history user interface further includes a suggested related search.

In some aspects, the techniques described herein relate to a method, wherein the history cluster is generated based on metadata associated with webpages in the portion, the metadata including a source event, an access timestamp, an engagement score, or subtopics associated with the topic.

In some aspects, the techniques described herein relate to a method, wherein the engagement score includes respective engagement metrics for the webpages in the portion, the respective engagement metrics used for selecting a prominence level with which to display, in the history cluster tab listing, snippets for at least one webpage in the portion.

In some aspects, the techniques described herein relate to a method, further including: receiving a request to remove a webpage rendered in a visit listing of the plurality of visit listings; and based on the request, deleting a stored record of access to the webpage from the search history.

In some aspects, the techniques described herein relate to a computer-implemented method including: generating a repository of metadata based on a plurality of webpages accessed and saved in a browser history of a web browser executing on a computing device, the metadata including, for respective webpages, a source event, an access timestamp, and at least one topic; generating, based on the metadata, a history cluster including a portion of webpages of the plurality of webpages related to a topic; assigning respective scores for the webpages in the portion, the respective scores based at least in part on the access timestamps and engagement scores for the respective webpages; in response to a request to view browser activity associated with the topic, generating a history cluster listing for the topic, the history cluster listing including visit listings associated with webpages in the history cluster that are determined to have a score that meets a threshold score and the visit listings being organized according to the respective scores; and displaying the history cluster listing.

In some aspects, the techniques described herein relate to a computer-implemented method, wherein history cluster generation is based on the source events and the access timestamps of the webpages in the portion.

In some aspects, the techniques described herein relate to a computer-implemented method, wherein a visit listing of the visit listings includes a snippet for at least one webpage of the plurality of webpages in the portion and the history cluster includes a related action control for initiating an action related to the history cluster.

In some aspects, the techniques described herein relate to a computer-implemented method, wherein the history cluster listing further includes: a plurality of visit listings corresponding to at least one webpage in the portion, the plurality of visit listings being presented within the browser history of the web browser; and an action control configured to resume a previous search associated with the plurality of visit listings.

In some aspects, the techniques described herein relate to a computer-implemented method, wherein the metadata further includes, for a webpage of the plurality of webpages, determined webpage entities, a plurality of related searches, or a dwell time on the webpage.

In some aspects, the techniques described herein relate to a computer-implemented method, wherein the metadata further includes webpage identifiers defined for the webpages in the portion, the webpage identifiers indicating whether respective webpages in the portion are part of a tab group, a bookmark, or a search results page accessed by the computing device.

In some aspects, the techniques described herein relate to a computer-implemented method, wherein the engagement scores include respective engagement metrics for the webpages in the portion, the respective engagement metrics used for selecting a prominence level with which to display, in the history cluster listing, snippets for at least one webpage of the plurality of webpages in the portion.

In some aspects, the techniques described herein relate to a computer-implemented method, wherein generating the repository of metadata further includes de-duping the plurality of webpages accessed and saved in the browser history, the de-duping including: determining duplicative webpage accesses in the plurality of webpages accessed; selecting, for the duplicative webpage accesses, a webpage with a latest access timestamp with respect to access timestamps associated with the duplicative webpage accesses; and generating, for the webpage with the latest access timestamp, the metadata for storage in the repository.

In some aspects, the techniques described herein relate to a computer-implemented method, wherein the history cluster has a title and the method further includes displaying the title as a suggested link, wherein selection of the suggested link issues the request to view the history cluster.

In some aspects, the techniques described herein relate to a computer-implemented method, wherein: the suggested link is displayed as a search suggestion in a search engine; or the suggested link is displayed as an option in a search history of the web browser.

In some aspects, the techniques described herein relate to a non-transitory computer-readable medium including: at least one processor; and a memory storing instructions that, when executed by the at least one processor, cause the at least one processor to perform operations including: generating a repository of metadata based on a plurality of webpages accessed and saved in a browser history of a web browser executing on a computing device, the metadata including, for respective webpages, a source event, an access timestamp, and at least one topic; generating, based on the metadata, a history cluster representing a portion of webpages of the plurality of webpages related to a topic, the history cluster generation being based on the source events and the access timestamps of the webpages in the portion; assigning respective scores for the webpages in the portion, the respective scores based at least in part on the access timestamps and generated engagement scores for the respective webpages; in response to a request to view browser activity associated with the history cluster, generating a history cluster listing for the topic, the history cluster listing including visit listings associated with webpages in the portion that are determined to have a score that meets a threshold score and being organized according to the respective scores; and displaying the history cluster listing.

In some aspects, the techniques described herein relate to a non-transitory computer-readable medium, wherein a visit listing of the visit listings includes a snippet for at least one webpage of the plurality of webpages in the portion and the history cluster includes a related action control.

In some aspects, the techniques described herein relate to a non-transitory computer-readable medium, wherein the history cluster listing further includes: a plurality of visit listings corresponding to at least one of the webpages in the portion, the plurality of visit listings being presented within the browser history of the web browser; and an action control configured to resume a previous search associated with the plurality of visit listings.

In some aspects, the techniques described herein relate to a non-transitory computer-readable medium, wherein the metadata further includes, for a webpage of the plurality of webpages, determined webpage entities, a plurality of related searches, and a dwell time on the webpage.

In some aspects, the techniques described herein relate to a non-transitory computer-readable medium, wherein the history cluster is generated as output of a model executing on the computing device and using the metadata as input.

In some aspects, the techniques described herein relate to a non-transitory computer-readable medium, wherein the metadata further includes a webpage identifier defined for a web page of the webpages in the portion, the webpage identifier indicating whether the webpage is part of a tab group, a bookmark, or a search results page accessed by the computing device.

In some aspects, the techniques described herein relate to a non-transitory computer-readable medium, wherein the generated engagement scores include respective engagement metrics for the webpages in the portion, the respective engagement metrics used for selecting a prominence level with which to display, in the history cluster listing, snippets for at least one webpage of the plurality of webpages in the portion.

In some aspects, the techniques described herein relate to a non-transitory computer-readable medium, wherein generating the repository of metadata further includes de-duping the plurality of webpages accessed and saved in the browser history, the de-duping including: determining duplicative webpage accesses in the plurality of webpages accessed; selecting, for the duplicative webpage accesses, a webpage with a latest access timestamp with respect to access timestamps associated with the duplicative webpage accesses; and generating, for the webpage with the latest access timestamp, the metadata for storage in the repository.

In some aspects, the techniques described herein relate to a non-transitory computer-readable medium, wherein the history cluster has a title and the operations further includes displaying the title as a suggested link, wherein selection of the suggested link issues the request to view the history cluster.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present disclosure.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. The appended claims have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A non-transitory computer-readable medium storing instructions that, when executed by at least one processor, causes a computing device to perform operations including:
   generating via a model executing on the computing device a history cluster defined as a data object by analyzing metadata associated with a plurality of webpages accessed and saved in a search history of a web browser, the history cluster representing activities from the plurality of webpages grouped by a semantic topic;
   in response to receiving a selection of a menu item presented on a history page, generating a search history user interface that includes:
      a history cluster listing populated with data from the history cluster, wherein the history cluster listing includes a plurality of visit listings corresponding to at least a portion of the plurality of webpages included in the history cluster, and
      a user interface element programmatically linked to the history cluster and configured to, in response to selection, initiate an action for the history cluster; and
   causing display of the search history user interface.

2. The non-transitory computer-readable medium of claim 1, wherein the action is reissuing a query associated with the semantic topic of the history cluster.

3. The non-transitory computer-readable medium of claim 1, wherein the action is deleting the plurality of webpages from the search history.

4. The non-transitory computer-readable medium of claim 1, wherein the action is initiating a suggested related search.

5. The non-transitory computer-readable medium of claim 1, wherein the action is opening the portion of the plurality of webpages as tabs in a tab group.

6. The non-transitory computer-readable medium of claim 1, further comprising:
   receiving at least a partial query in a query input area;
   determining that the partial query relates to the history cluster; and
   in response to determining that the partial query relates to the history cluster, providing a user interface element configured to, in response to selection, initiate generation of the search history user interface.

7. The non-transitory computer-readable medium of claim 1, wherein analyzing the metadata further includes de-duping the search history of the web browser by, for a plurality of duplicative webpage accesses, retaining a webpage having a latest access timestamp and discarding other webpages of the plurality of duplicative webpage accesses.

8. The non-transitory computer-readable medium of claim 1, wherein the history cluster listing further includes a visual indication that a webpage corresponding to a visit listing is part of a tab group or is bookmarked.

9. A method executed by a computing device, the method comprising:
   generating via a model executing on the computing device a history cluster defined as a data object by analyzing metadata associated with a plurality of webpages accessed and saved in a search history of a web browser, the history cluster representing activities from the plurality of webpages grouped by a semantic topic;
   in response to receiving a selection of a menu item presented on a history page, generating a search history user interface that includes:
      a history cluster listing populated with data from the history cluster, wherein the history cluster listing includes a plurality of visit listings corresponding to at least a portion of the plurality of webpages included in the history cluster, and
      a user interface element programmatically linked to the history cluster and configured to, in response to selection, initiate an action for the history cluster; and
   causing display of the search history user interface.

10. The method of claim 9, wherein the action is reissuing a query associated with the semantic topic of the history cluster.

11. The method of claim 9, wherein the action is deleting the plurality of webpages from the search history.

12. The method of claim 9, wherein the action is opening the portion of the plurality of webpages as tabs in a tab group.

13. The method of claim 9, further comprising:
    receiving at least a partial query in a query input area;
    determining that the partial query relates to the history cluster; and
    in response to determining that the partial query relates to the history cluster, providing a user interface element configured to, in response to selection, initiate generation of the search history user interface.

14. A non-transitory computer-readable medium storing instructions that, when executed by at least one processor, causes a computing device to perform operations including:
    receiving at least a partial query in a query input area of a web browser;
    determining that the partial query relates to a history cluster, the history cluster representing activities grouped by a semantic topic and identified by analyzing metadata associated with a plurality of webpages, wherein the plurality of webpages are accessed and saved in a search history of the web browser, the metadata including source events and access timestamps; and
    in response to determining that the partial query relates to the history cluster, modifying an autocomplete component of the web browser to present a user interface element as a distinct suggestion among a plurality of URL suggestions retrieved from the search history, the user interface element programmatically linked to the history cluster and configured to, in response to selection, initiate display of the history cluster,
    wherein initiating display of the history cluster includes generating a history cluster listing that includes a plurality of visit listings corresponding to at least a portion of the plurality of webpages included in the history cluster, and wherein the user interface element is generated based on the history cluster being stored distinctly from the search history.

15. The non-transitory computer-readable medium of claim 14, wherein the user interface element is a first user interface element, and the operations further comprise:

determining that the partial query relates to a prior search; and in response to determining that the partial query relates to the prior search, presenting a second user interface element configured to, in response to selection, resubmit the prior search.

16. The non-transitory computer-readable medium of claim 14, wherein determining that the partial query relates to the history cluster includes matching the partial query to one or more keywords associated with the history cluster.

\* \* \* \* \*